United States Patent [19]
Cochrane et al.

[11] Patent Number: 5,873,075
[45] Date of Patent: Feb. 16, 1999

[54] SYNCHRONIZATION OF SQL ACTIONS IN A RELATIONAL DATABASE SYSTEM

[75] Inventors: Roberta Jo Cochrane, Los Gatos; George Lapis; Mir Hamid Pirahesh, both of San Jose, all of Calif.; Richard Sefton Sidle, Toronto, Canada; David Everett Simmen; Tuong Chanh Truong, both of San Jose, Calif.; Monica Sachiye Urata, Saratoga, Calif.

[73] Assignee: International Business Machines Corporation, Armonk, N.Y.

[21] Appl. No.: 884,832

[22] Filed: Jun. 30, 1997

[51] Int. Cl.[6] .................................................. G06F 17/30
[52] U.S. Cl. ................................................................ 707/2
[58] Field of Search .................................. 395/600; 707/2

[56] References Cited

U.S. PATENT DOCUMENTS

| | | | |
|---|---|---|---|
| 4,769,772 | 9/1988 | Dwyer | 707/2 |
| 4,829,427 | 5/1989 | Green | 707/4 |
| 5,276,870 | 1/1994 | Shan et al. | 707/2 |
| 5,301,317 | 4/1994 | Lohman et al. | 707/2 |
| 5,325,525 | 6/1994 | Shan et al. | 395/674 |
| 5,345,585 | 9/1994 | Iyer et al. | 707/2 |
| 5,367,675 | 11/1994 | Cheng et al. | 707/2 |
| 5,386,557 | 1/1995 | Boykin et al. | 707/1 |
| 5,495,605 | 2/1996 | Cadot | 707/4 |
| 5,546,576 | 8/1996 | Cochrane et al. | 707/2 |

OTHER PUBLICATIONS

James R. Groff et al., LAN Times Guide to SQL, Osbourne, McGraw–Hill, 1994, pp. 268–285.

Hamid Pirahesh et al., "Extensible/Rule Based Query Rewrite Optimization in Starburst," Proc. ACM–SIGMOD Int'l. Conf. on Management of Data, Jun. 1992, pp. 39–48.

Kevin Owens et al., "Oracle 7 Triggers: The Challenge of Mutating Tables," Database Programming and Design, v. 7, N. 10 (Oct. 1994), pp. 47–55.

Guy Lohman, "Grammar–like Functional Rules for Representing Query Optimization Alternatives," IBM Almaden Research Center Report, San Jose, CA, 1988, pp. 18–27.

*Primary Examiner*—Maria N. Von Buhr
*Attorney, Agent, or Firm*—Gray Cary Ware Freidenrich

[57] ABSTRACT

An automated system for detecting and preventing mutating table violations of database integrity in a SQL query before generation and selection of an optimal query execution plan (QEP). This system modifies the query graph model (QGM) to restrict the choice of execution plans to those that avoid mutating table integrity (MTI) violations, thereby forcing database integrity during table mutation when executing the optimal QEP. Mutating table integrity violations are detected by evaluating the position in the QGM of each write-node referencing a particular base table with respect to each of the positions of all other read- and write-nodes referencing of the same base table. Every common-referencing node pair is tested for sequencing conflicts and a data-flow dam is inserted in the QGM where necessary or a poke query is inserted between the nodes to force the completion of the execution of one node before initiating execution of the other common-referencing node. The system of this invention allows processing of all non-cyclic and most cyclic SQL queries known to cause mutating table integrity violations, such as queries having searched and positioned inserts, deletes and updates, and row-level triggers.

40 Claims, 21 Drawing Sheets

DEPARTMENT TABLE

| DEPTNO | ADMINDNO |
|---|---|
| Primary Key | Foreign Key |

SIMILAR DEPARTMENT TABLE

| DNO | ADNO |
|---|---|
| 2 | 1 |
| 1 | — |

60 ↗
62 ↗

EMPLOYEE TABLE

| EMPNO | EMPNAME | WORKDEPT |
|---|---|---|
| 001 | BLOGS | A00 |
| 002 | ABLE | — |
| 004 | BOND | M05 |
| 005 | SMART | ZZZ |

Primary Key

| DEPTNO | ADMINDNO |
|---|---|
| 2 | 1 |
| 1 | — |
| Primary Key | Foreign Key |

66 ↗
64 ↗

DEPARTMENT
CASCADE  CASCADE
Works In ↓  Reports To ↓
EMPLOYEE

| DEPTNO |
|---|
| A |
| B |
| C |

| EMPNO | WORKS | REPORTS |
|---|---|---|
| 1 | A | B |
| 2 | B | B |
| 3 | C | C |

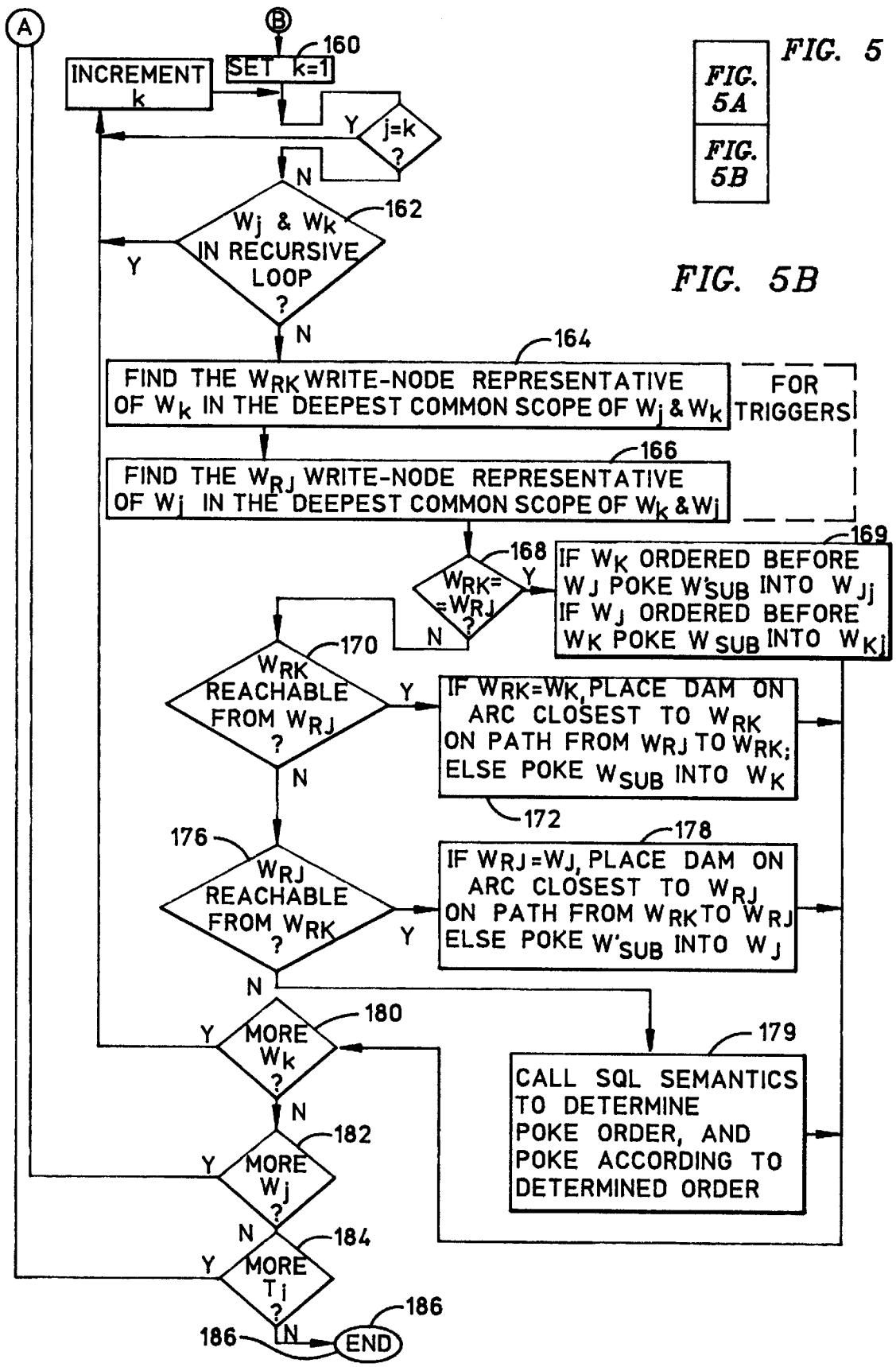

SYNCHRONIZATION OF SQL ACTIONS IN A RELATIONAL DATABASE SYSTEM

CROSS-REFERENCE TO RELATED APPLICATIONS

This application relates to U.S. Pat. No. 5,546,576 (the "'576 patent"), which issued on Aug. 13, 1996, naming common inventors, and entitled "Query Optimizer System That Detects and Prevents Mutating Table Violations of Database Integrity In A Query Before Execution Plan Generation". The disclosure of the '576 patent is fully incorporated herein by this reference.

BACKGROUND OF THE INVENTION

1. Field of the Invention

This invention relates generally to systems for automatic query optimization and execution in relational database management systems (RDBMS) and, particularly to a producer-driven, shared-nothing, parallel execution RDBMS for restricting execution plans during query merger and optimization to eliminate all plans containing mutating table violations of database integrity.

2. Description of the Related Art

A relational database management system (RDBMS) is a computer database management system that uses relational techniques for storing and retrieving data. Relational databases are computerized information storage and retrieval systems in which data in the form of tables (formally denominated "relations") are typically stored for use on disk drives or similar mass data stores. A "table" includes a set of rows (formally denominated "tuples" or "records") spanning several columns (formally denominated "attributes"). Each column in a table includes "restrictions" on the data contents thereof and may be designated as a primary or foreign key. Reference is made to C. J. Date, *An Introduction to Database Systems*, 6th edition, Addison-Wesley Publishing Co. Reading, Mass. (1994) for an comprehensive general treatment of the relational database art.

A shared-nothing relational database system (SN-RDBMS) is a database system in which a table's data set is typically partitioned over a group of logical processing units (LPUs) each comprising a central processing unit and some logical unit of disk storage space. Each LPU in a LPU group is managed by a separate executing instance of the SN-RDBMS. A SN-RDBMS environment thus extends across plural LPU groups each comprising plural LPUs.

An RDBMS is structured to accept commands to store, retrieve and delete data using high-level query languages such as the Structured Query Language (SQL). The term "query" denominates a set of commands for retrieving data from a stored database. The SQL standard has been promulgated by the International Standards Association since 1986. Reference is made to the SQL-92 standard "Database Language SQL" published by the ANSI as ANSI X3.135-1992 and published by the ISO as ISO/IEC 9075:1992 for the official specification of the 1992 version of the Structured Query Language. Reference is also made to James R. Groff et al. (*LAN Times Guide to SQL*, Osborne McGraw-Hill, Berkeley, Calif., 1994) for a lucid treatment of SQL-92.

With a SN-RDBMS, a scan on a table T requires that the scan logic be distributed to all LPUs that hold a partition on T. When an application issues a "SELECT * from T" SQL statement, the statement is processed in the context of the LPU to which the application is connected, known as the coordinator. The scan logic is distributed to all the relevant LPUs, and each returns its LPU data to the coordinator. The coordinator in turn collects and returns the data to the application.

A producer-driven system is symbolized by a data-flow machine in which information flows from producers, which provide results when produced so that the results are available for any consumer requesting them, whether or not any consumer is ready for them. In producer-driven systems, results are buffered or queued. An SN-RDBMS is an instance of a producer-driven system in which results are queued in structures called "table queues" (TQS).

As used herein, a "query" refers to a set of user commands for retrieving data from the stored database. The query language requires the return of a particular data set in response to a particular query but the method of query execution ("Query Execution Plan") employed by the RDBMS is not specified by the query. There are typically many different useful execution plans for any particular query, each of which returns the required data set. For large databases, the execution plan selected by the RDBMS to execute a query must provide the required data return at a reasonable cost in time and hardware resources. Most RDBMSs include a query optimizer to translate queries into an efficiently executable plan. According to the above-cited Date reference, the overall optimization process includes four broad stages. These are (1) casting the user query into some internal representation, (2) converting to canonical form, (3) choosing prospective implementation procedures, and (4) generating executable plans and choosing the cheapest of said plans.

For example, FIG. 1 shows a query translation process known in the art. Queries written in SQL are processed in the phases shown, beginning with lexing at step 13, parsing and semantic checking at step 14, and conversion to an internal representation denoted the Query Graph Model (QGM) 15, which is a command data-structure that summarizes the semantic relationships of the query for use by the query translator and optimizer components. A query global semantics (QGS) process 17 adds constraints and triggers to QGM 15. A QGM optimization procedure 16 then rewrites the query into canonical form at the QGM level by iteratively "rewriting" one QGM into another semantically equivalent QGM 15. Reference is made to U.S. Pat. No. 5,367,675 issued to Cheng et al., entirely incorporated herein by this reference, for a discussion of a useful QGM rewrite technique that merges subqueries. Also, reference is made to U.S. Pat. No. 5,276,870 wherein Shan et al. describe a QGM optimization technique that introduces a "view" node function to the QGM to permit base table references to "VIEWs" by other nodes. This conditions the QGM to permit the execution plan optimizer 18 to treat a view like a table.

QGM optimization procedure 16 rewrites QGM 15 to simplify the subsequent plan optimization process 18, which produces Query Execution Plans (QEPs). Plan optimization procedure 18 generates alternative QEPs and uses the best QEP 20 based on estimated execution costs. The plan refinement procedure 22 transforms optimum QEP 20 by adding information necessary at run-time to make QEP 20 suitable for efficient execution. Importantly, the QGM optimization step 16 is separate and distinct from the QEP optimization in step 18. Reference is made to U.S. Pat. No. 5,345,585 issued to Iyer et al., entirely incorporated herein by this reference, for a discussion of a useful join optimization method suitable for use in QEP optimization step 18. Reference is made to U.S. Pat. No. 5,301,317 issued to Lohman et al., entirely incorporated herein by the reference, for a description of an adaptive QEP optimization procedure suitable for step 18.

QGM 15 used in the Query Rewrite step 16 can be understood with reference to Pirahesh et al. ("Extensible/ Rule-Based Query Rewrite Optimization in Starburst", *Proc. ACM-SIGMOD Intl. Conf. on Management of Data*, San Diego, Calif., pp. 39–48, June 1992). A useful QGM known in the art is now described in detail. FIG. 2 provides a QGM graphical representation of the following SQL query:

SELECT DISTINCT Q1.PARTNO, Q1.DESCR, Q2.PRICE
FROM INVENTORY Q1, QUOTATIONS Q2
WHERE Q1.PARTNO=Q2.PARTNO
AND Q2.PRICE>100

A SELECT box 24 is shown with a body 26 and a head 28. Body 26 includes data-flow arcs 30 and 32, which are also shown as the internal vertices 34 and 36. Vertex 36 is a set-former that ranges on (reads from) the box 38, which provides records on arc 32. Similarly, vertex 34 ranges on box 40, which flows records on data-flow arc 30. The attributes to be retrieved from the query, PARTNO 46, DESC 48 and PRICE 50, are in head 28. Boxes 38 and 40 represent the base tables accessed by the query, INVENTORY 42 and QUOTATIONS 44, respectively. Box 24 embraces the operations to be performed on the query to identify the PARTNOs that match in the two base tables, as required by the join predicate 52 represented as an internal predicate edge joining vertices 34 and 36. Vertex 34 also includes a self-referencing predicate 54 to identify prices of those PARTNOs that exceed 100.

For the purposes of this invention, note that each box or node (formally denominated "quantifier node") in FIG. 2 is coupled to one or more other nodes by data-flow arcs (formally denominated "quantifier columns"). For instance, base table node 38 is coupled to select node 24 by data-flow arc 32 and base table node 40 is connected to select node 24 by data-flow arc 30. The activities inside select node 24 produce a new stream of data records that are coupled to the TOP node 56 along a data-flow arc 58. TOP node 56 represents the data output table requested by the query.

The object of several known QGM optimization procedures is to merge one or more nodes where possible by eliminating (collapsing) data-flow arcs. For instance, the above-cited Pirahesh et al. reference describes a set of rules for merging any number of nodes into a single SELECT node, with certain restrictions on non-existential or non-Boolean factor subqueries, set operators, aggregates and user-defined extension operators such as OUTER JOIN. Thus those skilled in the art know that QGM optimization step 16 usually rewrites the QGM to eliminate numerous nodes and data-flow arcs even before considering useful query execution plans in plan optimization step 18 (FIG. 1). Also, most execution plans usually pipeline data along the data-flow arcs without waiting to complete execution of a node before flowing data to the next node.

This situation is the basis of several well-known problems in the RDBMS art. These problems are known variously as database "integrity" problems, which arise from "violations" of "integrity rules" arising from column constraints, key constraints and the like. In the above-cited reference, Date uses the term "integrity" to refer to the accuracy or correctness of the data in the database. Related database processing problems include "mutating table violations" of constraints such as "relational integrity" constraints. Although mutating table violations may not affect database integrity directly, they can cause unpredictable variation in query results.

For instance, one or more columns in a base table may be assigned a "key attribute", such as "primary key" or "foreign key". The primary key of a base table uniquely identifies each record (row) in the table. A foreign key establishes a relationship between the base table and another parent table designated by the foreign key column attribute. Thus, a parent/child relationship may be established between two tables by adding a foreign-key column attribute to one and relating it to the primary-key column attribute in another, as is well-known in the art. Such relationships may be added without limit and each key attribute may span several columns.

Disadvantageously, there are four types of database updates that can corrupt the referential integrity of the parent/child relationships in a database. These include (a) inserting a new child record, (b) updating the foreign key in a child record, (c) deleting a parent record, and (d) updating the primary key in a parent record.

When a new row is inserted into the child table, its foreign key value must match one of the primary key values in the parent table, according to the column attribute. If the foreign key value does not match any primary key, inserting the row corrupts the database because there is now a child without a parent. Such an INSERT is typically rejected by the RDBMS. Inserting a row in a parent table never gives this problem because it simply becomes a parent without children. Updating the foreign key in a child record is a different form of this problem. If the foreign key is modified by an UPDATE statement, the new value must match some primary key value in the parent table to avoid "orphaning" the updated record.

Upon deletion of a parent record that has one or more children, the child records are orphaned because their foreign key values no longer match any existing primary key value in the parent table. Such violations either cause the DELETE operation to be rejected, CASCADE to delete the orphaned child, or reset the orphaned child foreign key column to NULL (or DEFAULT). Deleting a record from the child table is no problem because the parent merely loses a child. Updating the primary key in a parent record is a different form of this problem. If the primary key of a parent record is modified, all existing children of that record become orphans because their foreign key values no longer match an existing primary key value.

For each parent/child relationship created by a foreign key, SQL provides for an associated delete rule and an associated update rule. The delete rule specifies DBMS action when a user tries to delete a parent record. Available rules include RESTRICT, CASCADE, SET NULL, and SET DEFAULT. The update rule specifies one of these RDBMS actions when the user tries to update the value of one of the primary key columns in the parent table. The usual RESTRICT rule merely rejects the attempted operation. The CASCADE rule automatically deletes or updates records from the children responsive to a command to delete or update a parent record. As is well-known, a CASCADE update may propagate across many base tables, converting each into a "mutating table" at times during the referentially-triggered actions. The base table object of the DELETE may also be mutating.

Practitioners in the art have proposed several classes of solutions to this referential integrity problem. For instance, insertion of a child record may be rejected with an error message because a search of the parent table does not find the child record key. UPDATE of a primary key in a parent record may be rejected or cascaded to change all related child keys to the same value (or to a NULL or DEFAULT value). Such a requirement is herein denominated a "referential constraint". A table that is in the process of being modified responsive to an UPDATE, DELETE or INSERT statement or because of the propagating enforcement of a referential constraint is herein denominated a "mutating table." As used herein, any table that is in the process of modification by a particular relational operation is said to be a "mutating table." In general, user-specified SQL operations that attempt to read or modify a mutating table are rejected as invalid at run-time. Proper semantics require the completion of a table-mutating operation before any other operation is allowed to read or modify the table.

Until now, other than "version-logging" of a mutating database, user query restrictions were the only methods known in the art for preventing mutating table violations of integrity related to referential constraints and triggers. Restrictions on the types of legal queries generally operate by raising a compile-time or a run-time error return responsive to either a potential or actual mutating table violation. In general, the user query restrictions known in the art may be grouped as (a) restrictions on queries, (b) restrictions on the number of records modified by query, and (c) restrictions on row-level triggers.

Reference is made to the above-cited Groff et al. reference at pp. 266–285 for a detailed discussion of SQL provisions for referential integrity and triggered actions. Reference is also made to Kevin Owens et al. ("Oracle7 Triggers: The Challenge of Mutating Tables", *Database Programming and Design*, 7(10): 47–55, October 1994) for a detailed description of SQL trigger applications and the resulting mutating table violations of integrity. Owens et al. conclude that row-level and statement-level triggers are advantageous tools but row-level triggers can cause mutating table errors if the trigger performs a read from the same table or uses a column from the same table in a join. They recommend avoiding the problem by loading the table at the row-level and operating on it at the after-statement level to ensure completion of row-level updates before reading.

FIGS. 3A–3G show several examples of mutating table integrity problems known in the art. FIG. 3A shows a self-referencing DEPARTMENT base table and FIG. 3B shows a SIMILARDEPARTMENT base table that is identical to the DEPARTMENT table. The mutating table integrity violation occurs when attempting to execute the following query:

INSERT INTO DEPARTMENT
   SELECT * FROM SIMILARDEPARTMENT

The result of the execution of this query depends on the sequence in which the records (rows) of SIMILAR DEPARTMENT are accessed. If row 60 (FIG. 3B) is first read, the insert to DEPARTMENT fails because the ADNO column value of 1 does not exist in the primary key column DEPTNO of DEPARTMENT. If the row 62 is first read, the insert succeeds because the NULL value of the ADNO column does not violate the parent/child relationship between the DEPTNO and ADMINDNO columns. After insertion of row 62, a later attempt to insert row 60 succeeds because the DEPTNO primary key values now include the 1 from the earlier-inserted row 62.

It is appreciated by practitioners skilled in the RDBMS art that a query execution must succeed independent of the sequence of any possible execution plan. Also, the operation of the QGM Rewrite step 16 and QEP=Optimize step 18 (FIG. 1) together prevent any preconditioning of the execution sequence of the optimal QEP produced by the RDBMS. Accordingly, because record access sequence may not be predetermined, if a self-referencing table is the object of an INSERT statement with a subquery, the RDBMS must require that the subquery not return more than one row or that the INSERT statement be rejected. In practice, this violation is not detected until run-time, after completion of all query optimization activities. To avoid processing errors, the user is obliged in the art to "code around" this restriction to obtain the desired function.

The mutating table integrity violation associated with an attempt to update the primary key value of a parent record is exemplified by FIG. 3C in connection with the following SQL query:

UPDATE EMPLOYEE SET EMPNO=EMPNO+1
   WHERE EMPNO=<5

Because EMPNO is the primary key of the EMPLOYEE table, the result of this query depends on the sequence in which the records are read from the EMPLOYEE base table. If the rows are accessed in primary key order, the update fails because the first attempt to update record 001 to 002 duplicates the primary key of record 002, thereby violating the primary key column restriction. If the table is accessed in reverse order, the update succeeds because key 005 is replaced with key 006, key 004 is replaced with key 005 subsequently, and so forth, thereby avoiding any primary key column restriction violations. Thus, when the columns of a primary key are updated, the update statement must be restricted by the predicate to no more than one record. This violation is also usually undetected until run-time, after completion of query optimization. This problem also arises in a cursor-controlled update ("positioned" UPDATE) on any of the primary key columns or on columns of a VIEW derived from a primary key. That is, the RDBMS must prohibit the above query in an updatable cursor because the number of affected rows in a cursor operation cannot be predeterminately restricted to one row.

FIG. 3D illustrates a potential integrity violation in a self-referencing table subject to a DELETE WHERE CURRENT OF operation (a "positioned" DELETE). The foreign key column ADMINDNO is constrained with a CASCADE delete rule in this example query:

DECLARE CURSOR A
   SELECT * FROM DEPARTMENT
OPEN A
DO
   FETCH A
   DELETE FROM DEPARTMENT WHERE CURRENT OF A

The number of rows retrieved by this query depends on the sequence in which the rows are retrieved. If row 64 is first retrieved, the delete of primary key 1 cascades to row 66 and no more rows remain to be retrieved. If row 66 is first retrieved, the delete of primary key 2 does not cascade and row 64 is next retrieved.

A DELETE statement that has a subquery referencing a table that can be affected by the deletion of rows from the target table violates database integrity during table mutation and is accordingly prohibited in most RDBMSs. FIG. 3E illustrates an example of the potential problem arising from a DELETE with a subquery. For this example, another relationship has been set up between EMPLOYEE and DEPARTMENT. This relationship shows to which department the employee reports, which may differ from the one in which the employee works. FIG. 3F shows the records in DEPARTMENT and FIG. 3G shows the records in EMPLOYEE. This problem arises upon attempted execution of the SQL query:

DELETE FROM DEPARTMENT
   WHERE DEPTNO NOT IN (SELECT REPORTS FROM EMPLOYEE

WHERE EMPLOYEE.REPORTS=
DEPARTMENT.DEPTNO)

The SQL query is attempting to delete any department having no employee reporting to it. The result depends on the sequence in which the DEPARTMENT records are read. If department A is read first, the NOT IN clause is true so department A is deleted. This cascades from FIG. 3F to REPORTS in FIG. 3G, deleting EMPNOs 1 and 2. When DEPTNO B is read, the NOT IN clause is again true because EMPNOs 1 and 2 were deleted. Therefore, DEPTNO B is now deleted, which eliminates EMPNO 3 from FIG. 3G. Finally, DEPTNO C is read and deleted. If DEPTNO B is first accessed, the NOT IN clause is false and department B is not deleted. Similarly, department C avoids deletion. Accordingly, SQL queries must avoid multi-row deletions by subquery and instead delete one record at a time using the primary key as a predicate, which is an inconvenient user restraint.

The concept of a "trigger" is well-known in the art, and triggers are explicitly included in the SQL-93 standard promulgated by the ISO. For any event that causes a change in contents of a table, a user may specify an associated action that the RDBMS must execute. The three events that can "trigger" an action are attempts to INSERT, DELETE or UPDATE records in the table. The action triggered by an event may be specified by a sequence of SQL statements. Reference is made to the above-cited Owens et al. reference and the above-cited Groff et al. reference for detailed examples of row-level and statement-level triggers. Consider the following example.

When a new order is added to the ORDERS table, the SALES column for the salesperson who took the order should be increased by the amount of the order and the QTY_ON_HAND amount for the product being ordered should be decreased by the quantity ordered. This requirement is known in the art as a "business rule". A SQL trigger, named NEWORDER, can be included in a RDBMS to automatically update these database tables:

```
CREATE TRIGGER NEWORDER
   ON ORDERS
   FOR INSERT
AS UPDATE SALESREPS
   SET SALES=SALES+INSERTED.AMOUNT
   FROM SALESREPS. INSERTED
      WHERE SALESREPS.EMPL_NUM=
         INSERTED.REP
UPDATE PRODUCTS
   SET QTY_ON_HAND=INSERTED.QTY
   FROM PRODUCTS. INSERTED
      WHERE PRODUCTS.MFR_ID=INSERTED.MFR
         AND PRODUCTS.PRODUCT_ID=
            INSERTED.PRODUCT
```

The first part of the trigger definition conditions trigger invocation on the attempt of an INSERT on the ORDERS table. The remainder of the definition, following the keyword AS, defines the action of the trigger. In this example, the action is a sequence of two UPDATE statements, one for the SALESREPS table and one for the PRODUCTS table. The INSERTED pseudo-table refers within the UPDATE statements to the record to be inserted by the trigger. This particular example is a "for each statement" trigger that does not create a mutating table violation. As this example demonstrates, there are several non-standard versions of the SQL known in the art that extend the SQL-92 standard substantially to support triggers.

Triggers also provide a useful method for implementing the referential integrity requirements imposed on tables by foreign keys and primary keys and can implement extended forms of referential integrity. For instance, triggers may provide a CASCADE UPDATE feature in a SQL system that does not implement the CASCADE rule. Although the declarative referential integrity and table constraint language is preferred, triggers can be used to implement the transitional "business" rules that cannot be enforced with declarative statements.

In the above-referenced '576 patent, we disclosed a RDBMS which solved the foregoing problems by providing a system and method for optimizing the execution plan of a query in a manner that enforces database integrity. The concept of a data dam was introduced, whereby database integrity is enforced by reforming a query graph to restrict data flow paths between common referencing pairs of quantifier nodes so as to sequence the execution of such nodes. In a SN-RDBMS the foregoing system and method may not prevent all database integrity violations. A SN-RDBMS runs in a parallel processing environment in which queries are divided into distributed units of execution (known as distributed subsections or DSSs). Unlike serial processing databases, where query execution can be ordered (using subqueries) in a demand driven "top-down" fashion, a SN-RDBMS executes queries in a "bottom-up" fashion by sending DSSs (which may be subqueries of some containing query) out to the LPUs for processing. This distribution occurs at the commencement of query execution, i.e., the DSSs are processed in parallel. Lower level subqueries, such as reads, may therefore be processed prior to the execution of some other subquery, such as a write, even though a data dam has been placed to prevent premature execution of the lover level subqueries. In a SN-RDBMS, therefore, merely placing a data dam does not always guarantee that common referencing pairs of quantifier nodes will be executed in the desired order.

Accordingly, there is a clearly-felt need in the art for an automated process in a SN-RDBMS that enforces database integrity during table mutation in a query optimizer with full implementation of row-level and statement-level triggers. There is also a need in the art for an automated mutating table integrity enforcement process in a SN-RDBMS that eliminates run-time errors without SQL user query prohibitions. Modern query execution systems depend heavily on effective query optimization to reduce execution time and resource consumption and database integrity violation detection at run-time is too late for correcting the QEP to remove database integrity violation problems. There is in the art an unmet need for a query processing system in a SN-RDBMS that automatically restricts query execution plans to those plans having no mutating table integrity violations to avoid QEP failure at run-time. These unresolved problems and deficiencies are clearly felt in the art and are solved by this invention in the manner described below.

SUMMARY OF THE INVENTION

This invention solves the mutating table database integrity problem in a SN-RDBMS by detecting potential mutating table integrity violations early in the query graph model (QGM) process before QGM Rewrite and query execution plan (QEP) optimization. Upon detection of a potential mutating table integrity violation, the process of this invention either inserts data-flow barriers (dams) in the QGM to restrict both the QGM rewrite and the QEP generation process to produce only those query execution plans that enforce database integrity during table mutation, or the process inserts poke queries between common referencing nodes. Each dammed data-flow arc in the QGM operates to prevent any node merger during the QGM rewrite process that eliminates (collapses) the dammed arc. This data-flow barrier effectively forces the query optimizer to generate only those QEPs that complete operations on one side of the dam before beginning any operations on the other side, thereby imposing a "sequencing" property (without specifying any particular sequence). Each poke query ensures that common referencing nodes will execute in the desired order. In effect, the nodes are JOINed such that their execution order is maintained. Thus, according to this invention, the query optimizer generates and considers only those execution plans that enforce integrity during table mutation without relying on user query restrictions. This invention communicates information to the query optimizer needed to generate plans that do not allow mutating table integrity violations.

It is an object of the system of this invention to eliminate existing prohibitions on user query types in a SN-RDBMS. It is an advantage of the system of this invention that database integrity during table mutation is imposed on heretofore prohibited user queries.

It is another object of the system of this invention to avoid query failure at run-time in a SN-RDBMS arising from the selection of an optimal query plan containing mutating table integrity (MTI) violations. It is an advantage of the system of this invention that query optimization is performed over a database-integral plan space, thereby ensuring that only the optimal database-integral execution plan can be selected and executed.

It is yet another object of the method of this invention to provide for database integrity in a SN-RDBMS during table mutation in SQL queries containing SQL3 statement-level or row-level triggers. It is an advantage of the system of this invention that statement-level or row-level triggers can be accommodated without restriction and without violating database integrity during table mutation. It is a feature of the system of this invention that integrity is enforced by controlling the order of relational operations without prohibiting any particular relational operation, including even nested statement-level triggers.

Broadly, the invention may be applied in a producer-driven system of the SN-RDBMS type. The invention may also be practiced in a consumer-driven system although at reduced efficiency.

The foregoing, together with other objects, features and advantages of this invention, can be better appreciated with reference to the following specification, claims and accompanying drawing.

BRIEF DESCRIPTION OF THE DRAWING

For a more complete understanding of this invention, reference is now made to the following detailed description of the embodiments as illustrated in the accompanying drawing, wherein:

FIG. 5, comprising FIGS. 5A–5B, is a functional block diagram of a flowchart showing a preferred embodiment of the mutating-table violation prevention procedure of this invention;

FIG. 8, comprising

FIG. 13, comprising

DESCRIPTION OF THE PREFERRED EMBODIMENTS

The System of the Invention

Figure 4:
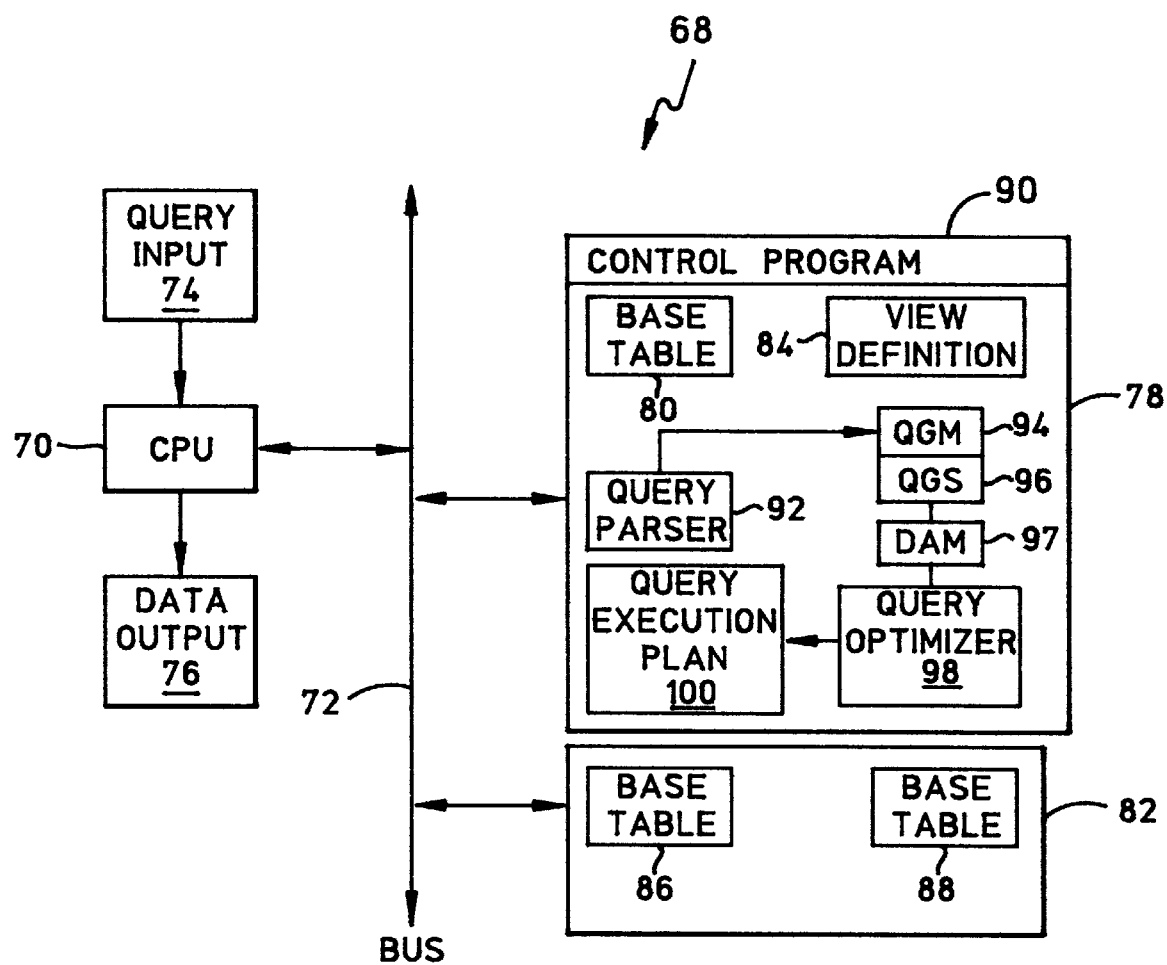
FIG. 4 is a functional block diagram of a relational database system suitable for application of the system of this invention.

FIG. 4 shows a functional block diagram of a computer-implemented database processing system 68 suitable for practicing the procedure of this invention. This exemplary configuration is described for illustrative purposes only and it should be appreciated that the process and system of this invention can be embodied within system 68 in many different useful fashions, including the arrangement depicted in FIG. 4. System 68 includes a central processing unit (CPU) 70, which is coupled to a parallel bus 72. The query input terminal 74 allows the user to enter queries into system 68, either from a remote terminal or through any other useful method known in the art. As used herein, a "user query" includes a combination of SQL commands intended to produce one or more output data tables according to specification included in the query. The data output terminal 76 displays the query results to the user and may be physically co-located with query input terminal 74.

System 68 includes the address space 78, which is shown schematically as containing program objects and data objects. The base table 80 is an example of a data object pulled into address space 78 from the external mass store 82 by way of bus 72. The view definition 84 is another data object representing a "virtual table" made up of elements from one or more base tables in accordance with a VIEW definition statement. External mass store 82 includes a generally large plurality of base tables, exemplified by base tables 86 and 88. These base tables are moved partially or entirely between memory space 78 and external mass store 82 in a manner well-known in the art for database management systems.

Address space 78 also includes the control program object 90, which manages the other components of system 68. These components include a query parser 92 for accepting the query input from terminal 74 and forwarding it to the Query Graph Model (QGM) optimizer 94. QGM optimizer 94 is shown as including a constraint processing module 96 in accordance with this invention.

QGM optimizer 94, with the participation of a query global semantics (QGS) processing module 96 and a data-flow dam processing module 97, rewrites the QGM representation of the user query to provide a "canonical form" of the QGM for output to the query optimizer 98. For instance, a QGM canonical form may include a large cyclical join graph having data-flow arcs from many base tables, subject to the restrictions applied by QGS processing module 96 and data-flow dam processing module 97 on the QGM rewrite process. After query optimizer 98 receives the canonical "database-integral" (DI) QGM from QGM optimizer 94, a generally large number of useful plans for executing the DI-QGM are generated and tested for "cost" in accordance with a predetermined cost formula. Each of these execution plans is database-integral because the canonical QGM is database-integral. After identifying an "optimal" query execution plan, optimizer 98 produces this plan as a program object, depicted as query execution plan 100 in address space 78. Plan 100 is finally executed with the assistance of control program 90 and the resulting table is forwarded to data output of display 76 upon completion. It can be appreciated by those skilled in the art that the description of system 68 in FIG. 4 is exemplary and that the system and process of this invention, represented as the combination of QGS and dam processing modules 96 and 97, may be incorporated in any RDBMS that uses a QGM optimization process.

Figure 14:
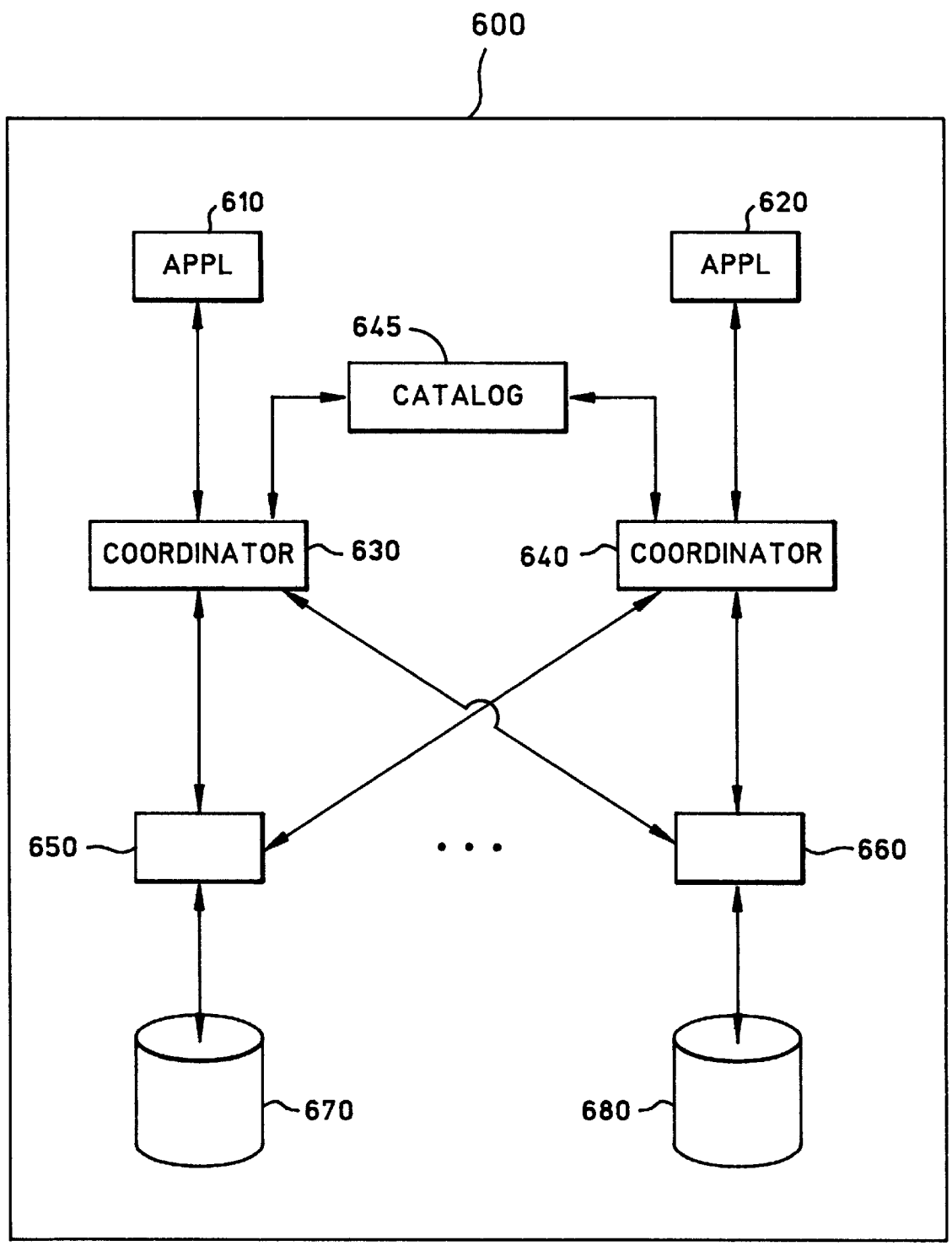
FIG. 14 is a functional block diagram of a shared-nothing relational database system suitable for application of the system of this invention.

FIG. 14 illustrates a SN-DBMS system 600. A pair of application programs 610 and 620 communicate with respective coordinator LPUs 630 and 640. The coordinator LPUs 630 and 640 communicate with the Catalog 645, which includes all of the various schemas and mappings used by the database. These include such objects as tables, indexes, users, integrity rules, security rules, as well as the table partition information and LPU assignments. Each coordinator LPU 630 and 640 communicates with downstream LPUs, two of which are illustrated by reference numerals 650 and 660. It will be understood that, while single lines are shown connecting the various LPUs, both control and data information is passed between the nodes. Each of the LPUs can have access to a storage device to store table partitions for which they is responsible. Two such storage devices are illustrated in FIG. 14 by reference numerals 670 and 680.

User Query Prohibitions

This invention eliminates the need for several prohibitions imposed by RDBMSs on SQL queries in the art to avoid run-time mutating table violations. These prohibitions can be organized into three groups: group (a) prohibition of certain queries; group (b) restrictions on the number of records on which modification is permitted in a certain query; and group (c) prohibition of certain operations performed by a row-level trigger. The query prohibitions known in the art that are obviated by this invention are now described in more detail.

Group (a) Prohibited Queries: DELETE or UPDATE is restricted to prohibit in the search condition a subquery that references the same base table that is the object of the modification, either directly or indirectly through a VIEW. INSERT is restricted to prohibit in the SELECT predicate any reference to the base table that is the object of the modification, either directly or indirectly through a VIEW. These queries are prohibited because the mutating table violation may occur when some records are modified by DELETE, UPDATE or INSERT before the subquery or SELECT predicate is fully computed. This may cause incorrect results because the subquery or SELECT predicate results may change after modification of some of the records by the primary operations. In the art, these are considered mutating table violations because the subquery attempts to read the table while it is mutating.

DELETE and UPDATE are restricted to prohibit in the search condition any subquery that references a base table that may be modified by any CASCADE rule (DELETE CASCADE or UPDATE CASCADE) because of a cascading correction of a referential constraint violation arising from the modification. This query is prohibited also because a mutating table violation occurs when a cascaded modification is applied before the subquery is fully computed. Because the cascaded modification changes a table referenced by the subquery, the subquery may obtain different results upon reevaluation after the cascading is completed. The mutating table violation occurs when the subquery attempts to read the table that is the object of the cascaded modification.

In any of these situations, the mutating table violation can be prevented by requiring the subquery computation to complete before beginning any modifications to the object. However, until now, there has been no known method for segregating these operations during the query optimization process.

Figures 3A, 3B, 3C, 3D, 3E, 3F, 3G:
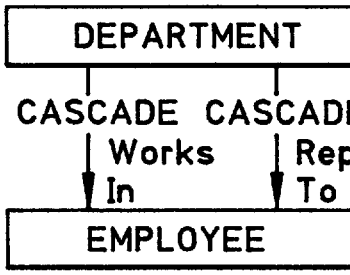
FIGS. 3A–3G provide exemplary tables to illustrate several prohibited query examples from the prior art that violate database integrity during table mutation.

Group (b) Restrictions on the Number of Records Modified by Query: INSERT is restricted to a single row when the object of the modification is involved in a self-referencing referential constraint in which no column of the foreign key is omitted from the column list. The number of records qualifying for a DELETE query is restricted to one record if the object of the DELETE is involved in a self-referencing referential constraint with a DELETE rule of SET NULL or CASCADE. When multiple records are inserted into or deleted from a table that has a self-referencing referential constraint, each record is reviewed for conformance to the constraint as it is inserted or deleted. Accordingly, the constraint evaluation results may depend on the order in which the records are inserted or deleted, as discussed above in connection with FIGS. 3A–3B. Whenever self referencing referential constraints are evaluated immediately upon processing of each record and there is more than one record to process, a mutating table violation occurs upon constraint evaluation because the evaluation must reference the (self-referencing) table that is being modified.

A CURSOR controlled DELETE operation, which uses the DELETE WHERE CURRENT OF statement, is restricted to prohibit self-referencing tables. That is, a self-referencing table cannot be the object of a DELETE WHERE CURRENT OF statement in the art. This prohibition results from the mutating table violation that occurs when the self-referencing constraint evaluation references itself during modification.

These prohibitions in the art can be eliminated by forcing the modification to completion before checking the self-referencing constraints, but, until now, there has been no known method for segregating these operations during query optimization, thereby obliging practitioners in the RDBMS art to prohibit these forms of user queries.

The Groups (a) and (b) restrictions discussed above also extend to VIEWs.

Group (c) Restrictions on Row-Level Triggers: A row-level trigger is restricted in the art to prohibit reading from the table upon which the trigger is defined. The above-cited Owens et al. reference provides a detailed description of the various row-level trigger prohibitions known in the art. Some practitioners impose a blanket prohibition on row-level triggers, permitting only statement-level triggers, to avoid mutating table violations. If the trigger is permitted to execute upon modification of each record by the triggering operation, any attempt to read the table on which the trigger is defined encounters only partial modifications and clearly raises a mutating table violation when more than one record is modified by the triggering operation. As mentioned above in describing Group (b), these violations can be avoided by forcing the modification to completion before executing the trigger.

Group (d) Restrictions/Potential Problem With Trigger Actions: If a write trigger action occurs on some table that is read or written by the triggering action, a constraint or another trigger action (either within the same trigger or in another trigger), then a run-time violation could occur if the conflicting statements are not synchronized.

The Query Graph Model

Figure 2:
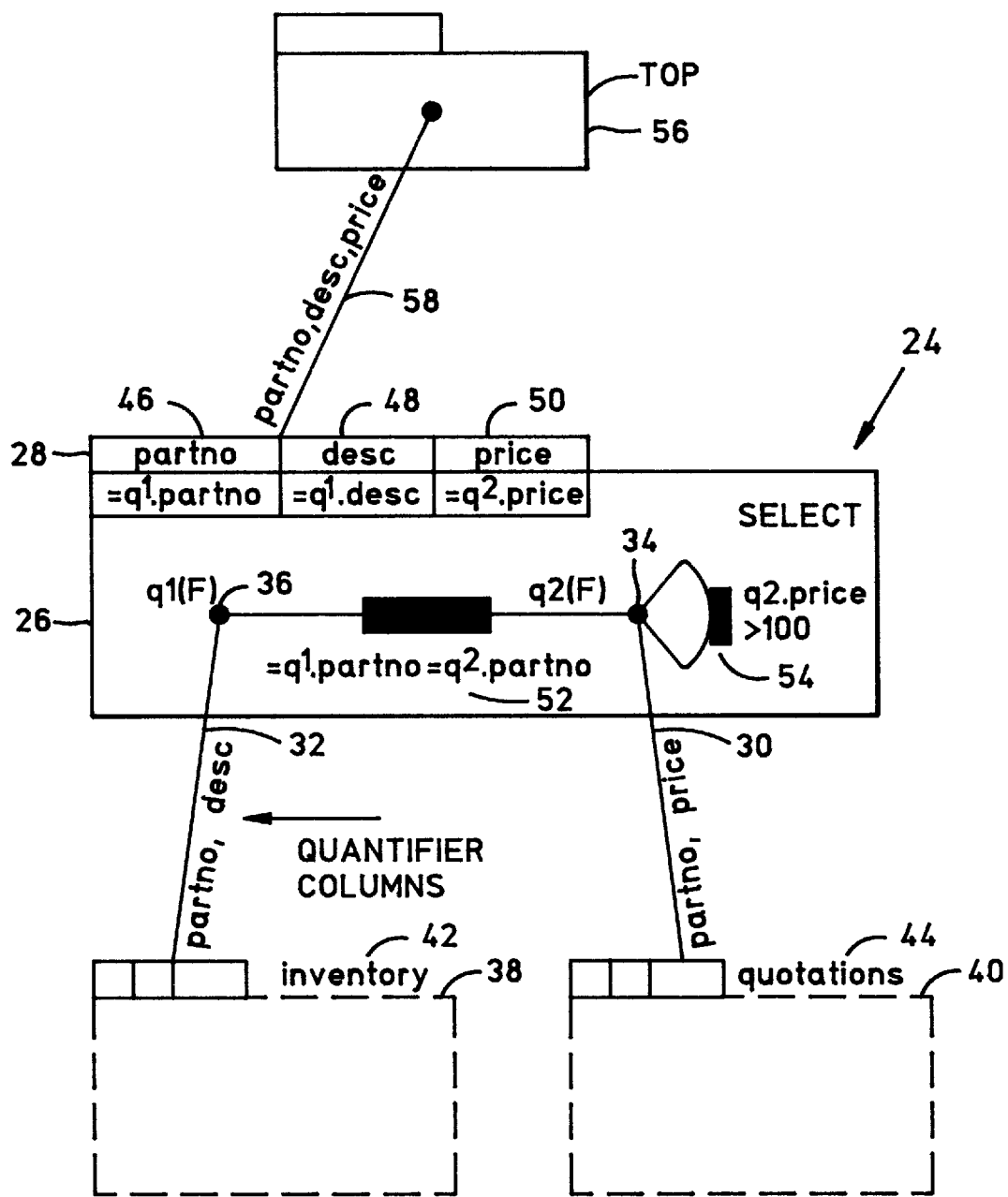
FIG. 2 shows a Query Graph Model (QGM) diagram from the prior art for an exemplary SQL query.

The process of this invention is described herein in terms of a simplified view of the Query Graph Model (QGM) discussed above in connection with FIG. 2. In accordance with the description of this invention, a query is represented as a directed graph G in which the nodes $\{N_1\}$ each represent tables or table expressions. Each non-base table node $N_i$ is connected to at least one other node $N_j$ by a directed data-flow arc $A_{ji}$ representing the consumption by node $N_i$ of records (tuple streams) produced by node $N_j$ for use in the computation of records internally to node $N_i$. Thus, $A_{ij} \neq A_{ji}$ because $A_{ij}$ represents the flow of data from $N_i$ to $N_j$.

The nodes $\{N_i\}$ are labeled according to the relational operation contained therein. For example, a SELECT node $N_{SELECT}$ represents a SELECT, PROJECT or JOIN operation on the data that flows in from the incoming data-flow arcs. A UNION node $N_{UNION}$ represents the UNION of data that flows along its incoming data-flow arcs and a base table node T represents all the records in a base table T. Each base table is represented by at most one node in the graph G that has no incoming arcs. Every node $N_i$ that has a non-cursor-positioning incoming arc $A_{ji}$ from a base table $T_j$ is considered a "read-node" $R_i$ of base table $T_j$. Accordingly, a node $N_i$ representing a JOIN between tables T and Q is both a read-node of base table T and a read-node of base table Q. Each graph G has one special node labeled TOP to represent the entire query. The TOP node has one incoming data-flow arc that represents the results of executing the query represented by graph G.

The combination of nodes $\{N_i\}$ interconnected by directed data-flow arcs $\{A_{ij}\}$ forms a network of data-flow paths whereby each node $N_i$ receives a flow of records from a subgraph $g_i$ that embraces some portion of the graph G. That is, for any incoming data arc $A_{ji}$ to a node $N_i$, a "subgraph" $g_i$ can be defined as the interconnected group of all nodes contributing to the data flowing along arc $A_{ji}$ into node $N_i$. Subgraph $g_i$ may contain node $N_i$ in a recursive graph G. As used herein, node $N_i$ is said to be "on the path of" each node $N_j$ within the subgraph $g_i$. A second node is said to be "on the path of" a first node wherever it is possible to make a traversal in the direction of data-flow from the first and second node along the directed data-flow arcs.

Modification operations are also represented as nodes in the graph G. These include the DELETE, INSERT and UPDATE nodes, which are herein denominated as "write-nodes" $W_i$. Write-nodes are characterized by the effects resulting from their performance responsive to receiving input data along the data-flow arcs. Each write-node $W_i$ is associated with the one or more base tables that are the object of the modification operation. The three types of modification nodes (write-nodes) are formally described as follows:

DELETE $(T_0, T_1, \ldots, T_n)$ represents a node that, given an input record r, deletes the record identified by r.rid from the base table r.tid, where r.rid identifies the record id and r.tid identifies a table id for a table $T_i$, 0<I=n.

INSERT $(T_0)$ represents a node that inserts the input records into base table $T_0$.

UPDATE $(T_0, T_1, \ldots, T_n)$ represents a node that, given an input record r, updates the record r.rid in base table r.tid, using the above definitions. The values used for the UPDATE are also part of the input record r.

A base table is an "object" of a write-node $W_i$ (DELETE, INSERT or UPDATE) if it is modified by the write-node $W_i$. Each write-node $W_i$ has exactly one incoming data-flow arc on which input records flow from a subgraph $g_i$. Again, subgraph $g_i$ may contain write-node $W_i$ in a recursive graph G. The single incoming data-flow arc represents the "search-condition" in the WHERE clause of a DELETE or UPDATE node and represents the SELECT clause or VALUES input for an INSERT node. Moreover, each write-node $W_i$ may also flow its input data onward to one or more other nodes in the query graph G. This feature can be used to denote constraint and trigger processing data-flows.

Each base table object of a $W_{UPDATE}$ or $W_{DELETE}$ node also has an outgoing data-flow arc that represents the "cursor-positioning read" of the object to be modified. For example, consider FIG. 12A, which represents a simple query DELETE FROM $T_0$. The base table $T_0$ is represented by the node 102 and the write-node $W_{DELETE}$ is represented by node 104. The data-flow arc 106 is depicted as a dotted line and represents the cursor-positioning read of base table $T_0$ for node 104. The select node 108 represents the record selection from base table $T_0$, which record is forwarded to delete node 104 along the data-flow arc 110. Thus, cursor-positioning arc 106 exists only because base node 102 is the object of delete node 104.

Figure 12A:
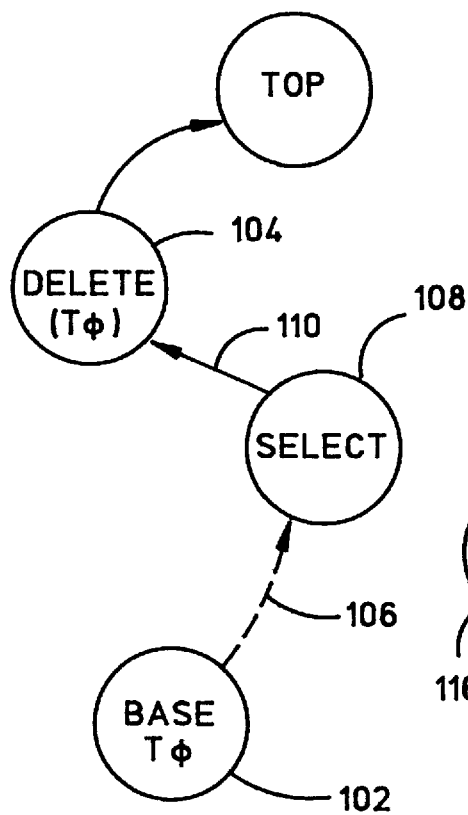
FIGS. 12A–12B provide exemplary query graphs to illustrate the "cursor-positioning read" arc representation of this invention.
Figure 12B:
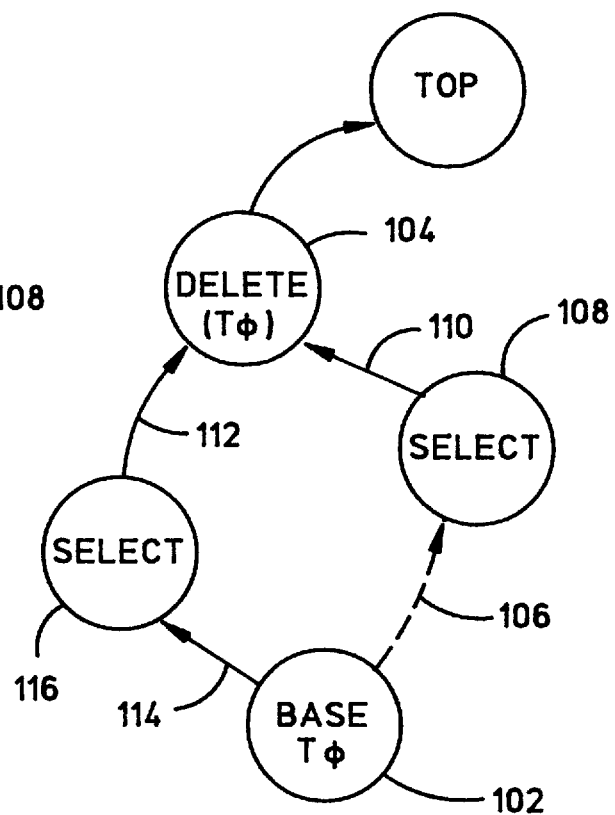

The query DELETE FROM $T_0$ WHERE $c_1$>5, which may also be represented by the graph G in FIG. 12A, wherein the predicate is internal to the select node 108. However, the query DELETE FROM $T_0$ WHERE $c_1$>(SELECT AVG ($c_1$) FROM $T_0$) is represented by the graph in FIG. 12B, where the data-flow arc 112 represents the subquery that computes the average value of column $c_1$ in base table $T_0$. Note that the data-flow arc 114 from base node 102 to the predicate select node 116 is a non-cursor-positioning read of base table $T_0$ that must be completely executed before write-node 104 begins mutating base table $T_0$. If the data-flow along arc 114 is not completed before commencement of the side-effect of node 104, a read on arc 114 may be attempted to compute the next value of the subquery during mutation of base table $T_0$ by write-node 104.

Figure 10:
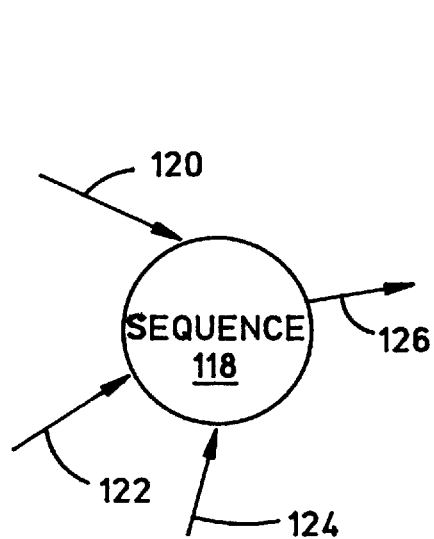
FIG. 10 shows a QGM representation of the SEQUENCE node-type of this invention.

In the '576 patent, a new type of node was introduced that imposes an order on its inflow arcs and does not produce any usable new data on its outflow arc. This node-type has been denominated the SEQUENCE node. It has one outflow arc and any plurality of inflow arcs. This is illustrated in FIG. 10 as the node 118, having inflow arcs 120, 122 and 124 and also having the single outflow arc 126. In a consumer driven system, if arc 120 precedes arc 122 according to the order restrictions imposed by the SEQUENCE node 118, then the subgraph g120 that produces data for arc 120 is forced to be completely computed before starting on the subgraph g122 that produces data for arc 122. However, in a data flow machine (producer-driven system), such a SEQUENCE node does not have the same effect. In such a system, the data is accessed from the leaf nodes to the inner nodes, so the sequencing on an inner node (i.e. the SEQUENCE node) will not synchronize the actions of the corresponding subgraphs. In a data flow machine, the order of the actions in these subgraphs is guaranteed by "poking" a subsequent action with a previous action.

The "scope" property accommodates triggers. Each trigger box is compiled into the same scope of the triggering "action". The trigger's "condition" is compiled into a nested scope, with the trigger box acting as its representative node in the "scope" of the triggering action. For instance, referring to FIGS. 9F–9G discussed below, the subgraph representing the trigger action is shown within a dotted region nested outside the scope of the main graph. A single SELECT node is the "trigger box" (node 368 in FIG. 9F and node 382 in FIG. 9G) representing the scope of the triggering action. Similarly, each statement in the trigger starts a new nested scope whose representative in the scope of the triggering action is the trigger box.

Operation of the Invention

The process of this invention is now described in detail in connection with the preferred embodiment illustrated in Tables 1–4 below and in FIGS. 5–8. To obviate all user query prohibitions discussed above, all constraint checking, constraint processing and trigger activities must be included in the query graph G. Further, the SEQUENCE node operator is used for imposing order on data-flows from different subgraphs.

Figure 1:
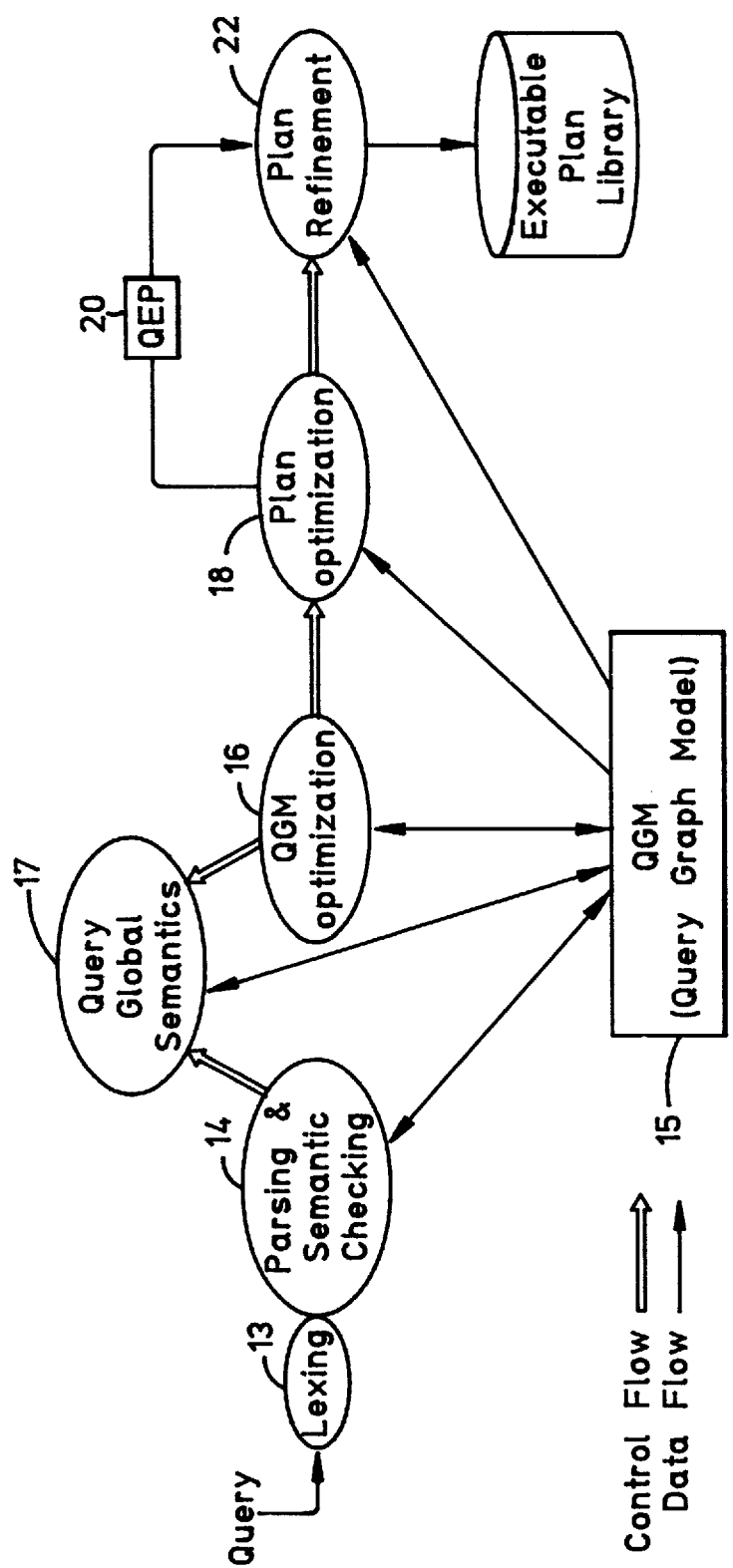
FIG. 1 shows a schematic representation of an exemplary query translation process from the prior art.

The process of this invention detects situations in the query graph G that may cause mutating table violations and inserts data-flow barriers or "dams" in selected data-flow arcs to force the choice of query execution plans that avoid mutating table violations. Detection is accomplished by evaluating the position in graph G of each write-node $W_k$ of a base table T with respect to the position of all read-nodes $\{R_k\}$ and all other write-nodes $\{W_k\}$ of the same base table T. The restricting dam placed along a data-flow arc represents a condition that requires complete computation of the subgraph $g_i$ feeding into the dammed data-flow arc before data is permitted to flow beyond the dam (i.e., before commencing "downstream" activity). In practical terms, a dammed data-flow arc is not made available for removal by the node compaction procedures in the QGM optimizer 16 (FIG. 1), for instance. For this reason, data-flow dams must be used sparingly to avoid losing otherwise acceptable low-cost query execution plans.

In the query graph, a recursive query is identifiable because it creates a "strongly connected" subgraph. As used herein, a subgraph is said to be "strongly connected" when every node in the subgraph is reachable from every other node in the subgraph by traversing the directed data-flow arcs of the subgraph. As used herein, a strongly connected subgraph is said to be "maximal" when there is no other containing graph that is also strongly connected. Data-flow damming is not suitable for a "strongly connected" component because any such attempt to dam data-flow in a recursive query prevents query execution. Accordingly, in the embodiments of this invention described below, it is always understood that no data-flow dams need be inserted in strongly connected components of a query graph.

In addition to data dams, the present invention introduces the concept of a poke-query. A poke query is necessary in some queries executing on a SN-RDBMS where data dams and the SEQUENCE node operator are inadequate because the DSSs are executed in parallel on separate LPUs. Two cases where parallel execution may result in database integrity violations despite the use of data dams are as follows:

a) a write and a read are in separate statements or constraints whose ordering was enforced by a demand driven execution of the statements.

Example: <a trigger with a write and a read in it>
In this case, the SEQUENCE operator works in a consumer-driven system, but not in a producer-driven one.

b) a write which must precede a read in which the write and read are in the same statement scope. In this case, the demand driven execution of the statements does not ensure that the read will not be requested in parallel with the write.

Figure 15:
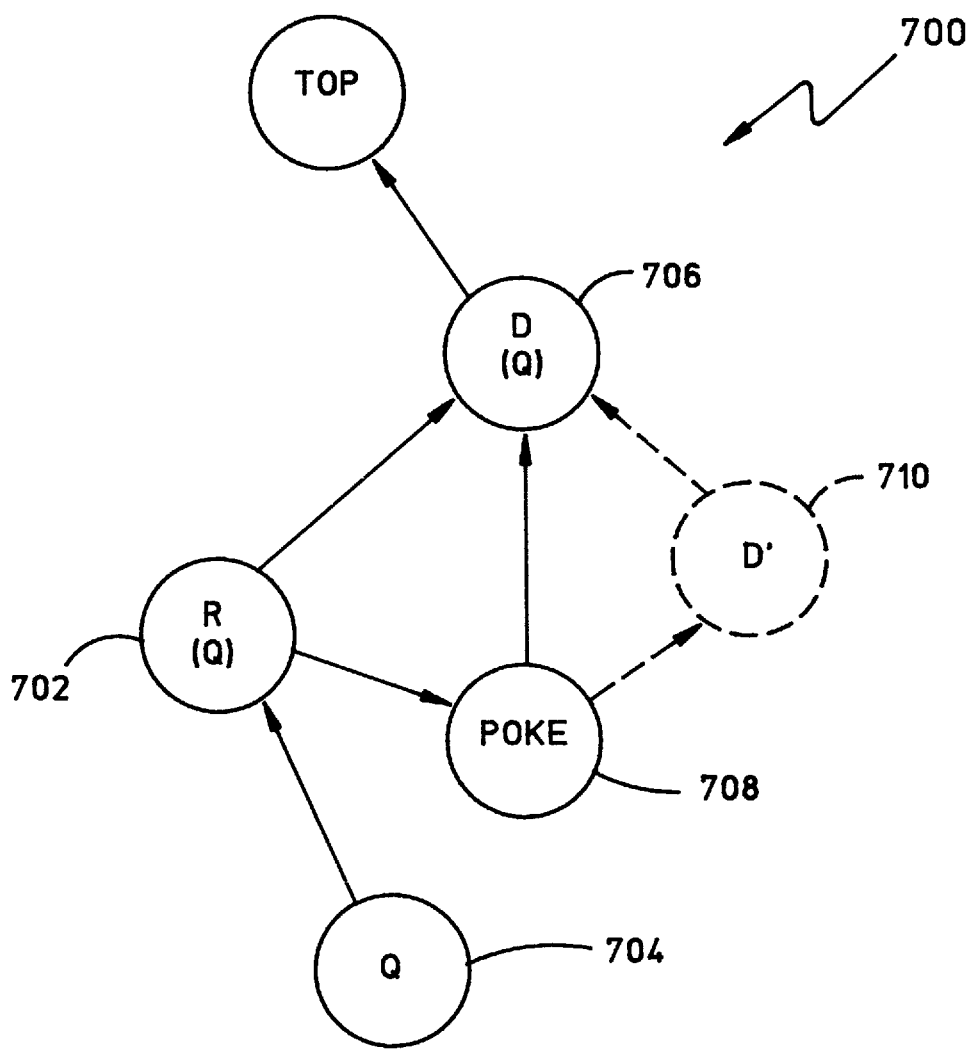
FIG. 15 is an exemplary query graph showing the use of a poke query in according to this invention.

The following example illustrates the operation of the poke query. With reference now to FIG. 15, assume there is a graph G, shown by reference numeral 700, containing a given subgraph R, shown by reference numeral 702, that must precede the access to the table Q, shown by reference numeral 704 for an operation D, shown by reference numeral 706, where Q is a base table node and D is a box. The correct placement of the poke query, shown by reference numeral 708, depends on the type of subquery represented by D. Before the poke query can be placed between R and D, there must be verification that the box D is indeed the box to be poked. If not, then a box D', shown by reference numeral 710, must be identified beneath D which will be poked. The criteria to find D' is as follows:

(1) If Box D is of type Update/Delete/Insert, then D' will be the input Select Box to D;

(2) If Box D is of type Union/Intersect/Except/OuterJoin, then a new Select Box D' is injected beneath the Box D along Q, and D' will have a quantifier Q that ranges over the base table access that was input as Q;

(3) If Box D is of type Select, and if (a) D has access to subqueries or tables other than Q (i.e., D has more than one quantifier), and (b) at least one of the subqueries or table accesses is different from Q and is not accessing another poke-subquery, then a new Select box D' is injected beneath D along the arc from Q to D, D will have a quantifier that ranges over D' such that there will be an arc from D' to D, and D' will have a quantifier that ranges over Q (such that there will be an arc from Q to D'); and (4) In all other types of Boxes, D' will be the same as D.

Once D' is found, D' and R are used to create a poke-subquery, as follows:

select 1 from values (1)

where forall (R, 1<>0);

This query evaluates the predicate 1<>0 for each row in R until the predicate evaluates to FALSE. Because 1<>0 is always true, all rows of R will be evaluated and the query will return 1 row. This subquery is the poke-query referred to above. The poke query is then added to the "from-clause" of D'. Because the poke-query generates 1 record, it will not change the result of D' ( i.e., it is a Cartesian product of the form 1 JOIN T). Note that the FORALL statement above could just as easily be written as "where not exist (R, 1=0)."

In the case where D' contains a read over a base table (as opposed to being a select box input of a write), the process of the invention marks the partitioning of the quantifier node that flows data from the poke-query to D' as a forced broadcast to all the nodes where the base table resides, and requires that the D' quantifier be evaluated before the base table access. This will ensure that the subgraph R is evaluated to completion before the base table scan is performed.

The group (a) query prohibitions discussed above can be obviated by placing a dam along the input arc $A_{ij}$ to a write-node $W_j$ whenever a read in the input subgraph $g_i$ must be completely computed before the write is performed. Note that a dam is sufficient because the write operation requires at least one input and thus will not be performed until the input from the dammed arc is received. The above group (b) and (c) prohibitions can be obviated by placing a poke query somewhere on the path from $W_j$ to node $N_i$ whenever the $W_j$ write must be performed before some read that is consumed by node $N_i$ reachable from the output arc $A_{ji}$. Note that a poke query is required because the read could otherwise be processed in a SN-RDBMS as a DSS prior to execution of the write, even with a dam in place.

To assist in appreciating the following description of the detailed operation of the system of this invention, the invention objectives are now briefly described. For each pair of conflicting nodes ($N_1$, $N_2$), the prospects for eliminating mutating table integrity violations are determined by the semantics of the closest ancestor node common to both conflicting nodes in the query graph. There are four types of common ancestors that may exist for any pair of conflicting nodes.

(1) One of the conflicting (common-referencing) nodes may be the closest common ancestor to both nodes (e.g., node $N_1$). In this case, the data-flow must be dammed somewhere on the path from $N_2$ to $N_1$, if $N_1$ is a write. If $N_1$ is a read, the $N_1$ must still be poked with $N_2$.

(2) A node representing a trigger may be the closest common ancestor to both common-referencing nodes. The data-flow inputs to a trigger node are (a) the triggering action, (b) the trigger condition, and the statements in the trigger body. If the conflict is between two statements in the trigger body or between a statement in the trigger body and the trigger condition, then the trigger itself indicates the semantics for the sequential execution of the trigger condition followed by each statement in order of occurrence in the trigger definition. In order to guarantee that execution of one of the two common-referencing nodes always completes before execution of the other begins, the trigger body must be poked with the trigger condition to avoid mutating table integrity violations.

(3) The closest common ancestor to the common-referencing conflicting node pair may be a SEQUENCE node. The SEQUENCE node indicates the order of the evaluation of constraints and triggers within a given scope. To ensure completion of the execution of one of the common-referencing nodes before execution of the other common-referencing node begins, the later node to execute must be poked by the earlier node.

(4) Finally, a SELECT node may be the closest common ancestor to the two common-referencing nodes. In this case, the SELECT node indicates an order on two or more data-flow executions. The write-node construction in the query graph limits the occurrence of this case to write-read conflicts where the conflicting common-referencing read-node is evaluating some constraint. Because the common-referencing read-node is evaluating a constraint for the common-referencing write-node, the SELECT ancestor-node requires execution of the write before beginning the read to avoid mutating table integrity violations. In this case, the conflicting common referencing read node will be poked by the common referencing write node to avoid possible mutating table integrity violations.

The process of this invention requires the identification of common ancestor nodes before setting data-flow dams or inserting poke queries. In large query graphs, these operations can be expensive. Accordingly, the preferred embodiment of the process of this invention includes a few basic limitations to reduce the expense of this search. Principal among these are rules exploiting the observations that (a) in a read-write conflict where the read-node must be computed before the write-node, the write-node is always the closest common ancestor-node within a common scope, and (b) where two conflicting nodes belong to different scopes, the closest common ancestor-node is always in the "deepest common scope" of the two conflicting nodes.

Within a common scope, because of the nature of write-nodes, if a write-node participates in a read-write conflict where the read-node must be computed before the write-node, then the write-node is the closest common ancestor node for the conflicting pair. Hence, for a pair of read-write conflicting nodes (W,R), the process of this invention begins by assuming W to be the common ancestor-node, avoiding a search of all ancestors for R. Similarly, for write-write conflicts within a common scope, at least one of the write-nodes must be the common ancestor-node. The process of this invention begins by assuming one of the write-nodes to be the common ancestor and reverses the roles only if the other write-node is not found on the path, again avoiding a search of all ancestor-nodes for both conflicting write-nodes.

When two conflicting nodes ($N_1$,$N_2$) belong to different scopes then the common ancestor is in the "deepest common scope" of $N_1$ and $N_2$. Accordingly, the search for the common ancestor-node can be reduced by jumping "up-scope" to find "representatives" ($N_{1rep}$, $N_{2rep}$) for each of the two conflicting nodes in the deepest common scope. In the case where either of the conflicting nodes is already in the deepest common scope, then that node acts as its own representative. That is, when both conflicting nodes originate in the same scope, $N_{1rep}$ is the same as $N_1$ (symbolically expressed as $N_{1rep}==N_1$) and $N_{2rep}$ is the same as $N_2$. After identifying representative nodes within a common scope, the process of this invention is then applied on the reduced query graph segment found within the one common scope.

Table 1 provides a preferred pseudocode embodiment of the process for detecting and setting dams and inserting poke queries for INSERT, DELETE and UPDATE operations, both "searched" and "positioned". The input is a query graph G representing a query with all constraints and triggers compiled in as nodes and data-flow arcs.

TABLE 1

```
prevent_mutating_table_violations (G/* the query graph */)
begin
    for each base table T in G
    {
        for each write-node W in which the base table is an    object
        {
```

TABLE 1-continued

```
/* Process read-write conflicts */
for each non-cursor-positioning read-node R of T
{
  LIST = NULL;
  compute_non_view_references(R,LIST); /* Table 3 */
  for each node N in LIST
  {
      Wrep =  representative of W in the deepest common scope
              of W and N;
      Nrep =  representative of N in the deepest common scope
              of W and N;
      if (Wrep == Nrep)
      {
         Wsub = the top of the subgraph beneath Wrep
    that contains W;
         Nsub = the top of the subgraph beneath Nrep
    that contains N;
         if W ordered before N by SQL semantics
         {
            poke Wsub into N.
         }
         if N ordered before W by SQL semantics
         {
            poke Nsub into W.
         }
                  // W and N are in statements or in the
                  // condition of the same trigger. The
                  // order of execution of these
                  // statements is defined by the trigger
                  // definition. The poke query is
                  // applied to the resulting ordering.
      }
      if (Wrep is reachable from Nrep in the graph G)
      {
         if (Wrep == W)
         {
         place a dam on the arc that is closest to Wrep on
         the path from Nrep to Wrep but not in a strongly
         connected component.
         // such an arc exists because Nrep and Wrep
         // are not in the same strongly connected
         // component.
         }
         else (Wrep !=W)
         { poke Nrep into W }
      }
      elseif (Nrep == N)
      { // we need search all of Nrep's ancestors if
        // Nrep is the same as N. Otherwise, Nrep
        // must represent a trigger.
        place_write_before_read_dams(Nrep,N,
        Wrep,NULL);
        /*Table2*/
      }
      elseif (Nrep is reachable from Wrep in the graph G)
      {
           poke Wrep into N.
      // When Nrep is reachable from Wrep in
      // the Graph G, a dam is not sufficient
      // to force the write before the read
      // because the scan that N represents
      // can be done at any time and shipped
      // to any processor in the system.
      // Hence, N must be poked with Wrep to
      // ensure that the subgraph at Wrep is
      // completed before the scan that N
      // represents.
      }
      else
      { Call SQL semantics to determine order of Nrep and Wrep
        if (SQL semantics dictates Nrep is before Wrep)
           poke Nrep into W;
        else // SQL semantics dictates Wrep is before Nrep
        poke Wrep into N;
      }
   }
 }
}
/* Process write-write conflicts */
for each write-node W' of T different from W:
```

TABLE 1-continued

```
{
if W and W' are not in the same strongly connected component
          /*not in a recursive write loop */
   {
     W'rep = representative of W' in the deepest common
           scope of W and W';
     Wrep = representative of W in the deepest common scope
           of W and W';
     if (W'rep == Wrep)
     {
        // W and W' are in statements or in the
        // condition of the same trigger. The order
        // of execution of these statements is
        // defined by the trigger definition. The
        // poke query is applied to the resulting
        // ordering.
        Wsub = the top of the subgraph beneath Wrep
             that contains W;
        W'sub = the top of the subgraph beneath Nrep
             that contains W';
        if W ordered before W' by SQL semantics
        {
          poke Wsub into W'.
        }
        if W' ordered before W by SQL semantics
        {
         poke W'sub into W.
        }
     }
     if (W'rep is reachable from Wrep in the graph)
        {
        if W'rep = W'
        {place a dam on the arc that is closest to W'rep
        on the path from Wrep to W'rep but not in a
        strongly connected component.
        // such an arc exists because Nrep and Wrep
        // are not in the same strongly connected
        // component.
        }
        else poke W' with subgraph of Wrep.
        // When W'rep is reachable from Wrep in the graph
        // G, then a dam is not sufficient to guarantee
        // W occurs before W' unless W'rep = W'.
        // Otherwise, W' is in a subgraph that could be
        // evaluated at any time and shipped to the
        // partition where W'rep is evaluated. Hence,
        // unless W'rep = W', we must poke W' into Wrep
        // to ensure that the subgraph at Wrep is
        // completed before the update represented by W'.
        }
     elseif (Wrep is reachable from W'rep in the graph G)
        {
        if Wrep = W
        {
        place a dam on the arc that is closest to
        Wrep on the path from W'rep to Wrep but not
        in a strongly connected component.
        // such an arc exists because Nrep and Wrep
        // are not in the same strongly connected
        // component.
        }
        else poke W with subgraph of Wrep.
        // When Wrep is reachable from W'rep in the
        // graph G, then a dam is not sufficient to
        // guarantee W' occurs before W unless Wrep = W.
        // Otherwise, W is in a subgraph that could be
        // evaluated at any time and shipped to the
        // partition where Wrep is evaluated. Hence,
        // unless Wrep = W, we must poke W into W'rep
        // to ensure that the subgraph at Wrep is
        // completed before the update represented by W.
        }
     else
     {
Call SQL semantics to determine order of Wrep and W'rep
if (SQL semantics dictates Wrep is before W'rep
   poke Wrep into W';
else // SQL semantics dictates W'rep is before Wrep
   poke W'rep into W;
```

TABLE 1-continued

```
        }
       }
      }
     }
    }
end
```

Table 2 provides a preferred pseudocode embodiment of the "place_write_before_read_dams (R,N,W,RA) subroutine called from Table 1.

TABLE 2

```
place_write_before_read_dams(R,   /* node that consumes a
                                     read of some table T */
                              N,  /* read_node of T */
                              W,  /* write_node of T */
                              RA    /* RA an arc whose subgraph contains the
                                     read R of table T */)
begin
    if (R is a squence box)
    {
        /* RA will not be NULL as the sequence box is never a read-
           node of a base table */
        for each input arc WA to R whose subgraph contains W
        {
            /* Note that all trigger actions are already ordered and
               any unordered subgraph represents either a constraint
               check or constraint enforcement. */
            if WA is not already ordered with respect to RA
            {
            if WA precedes RA, poke N with WA
            if RA precedes WA, poke W with RA
            if RA's subgraph represents a no-action constraint,
               order RA before WA
            if RA's subgraph represents a restrict constraint,
               order WA before RA
            }
        }
    }
    else
    {
        if (R is reachable from W in the graph)
        {
          poke N with W.
        }
        for each R' for which there exists an arc A from R to R';
        {
            place_write_before_read_dams(R', N, W, A);
        }
    }
end
```

Table 3 provides a preferred pseudocode embodiment of the compute_non_view_references (R, LIST) subroutine referenced in Table 1.

TABLE 3

```
compute_non_view_references(R, LIST)
begin
    if node R is in the definition of some view computed by a
        select-node V
    {
    for each node N that has an incoming arc from V
        compute_non_view_references(R, LIST);
    }
    else
    {
        add R to LIST;
    }
end
```

Figure 5A:
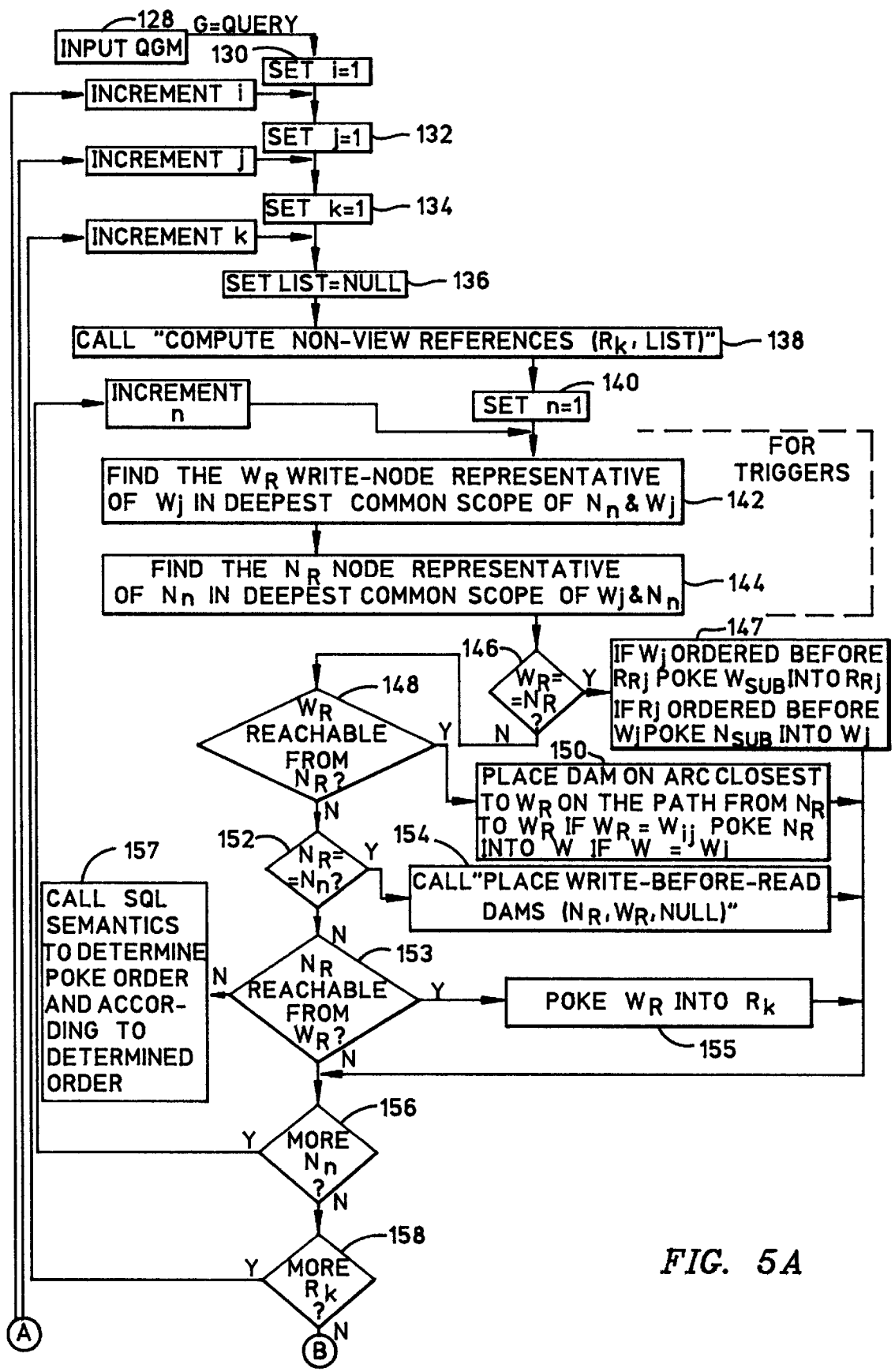

The pseudocode in Table 1 can be appreciated with reference to FIG. 5, which provides a functional block diagram of a flowchart substantially representing the pseudocode in Table 1. The procedure in FIG. 5 begins in FIG. 5A with the QGM input step 128. A first loop on index I begins at step 130 and indexes across base table nodes $T_i$ in graph G. This is an advantageous feature of the process of this invention, wherein the detection phase is indexed across base tables only and not pseudo-tables or views.

Within the first loop, a second loop starts at step 132 indexed on j over all write-nodes $\{W_j\}$ in graph G that have base table $T_i$ as their object. Within the j-index loop, a k-index loop begins at step 134 and indexes across all read-nodes $\{R_k\}$ that receive non-cursor positioning reads from base table $T_i$. Thus, it can be appreciated that the central process of this invention begins by selecting a base table $T_i$, then selecting the first write-node for which $T_i$ is the object and, for that first write-node $W_j$, scanning all non-cursor positioning read-nodes (and write-nodes as discussed below) for which $T_i$ is the object.

For each "common-referencing" pair of conflicting nodes, $W_j$ and $R_k$, the internal process begins with step 136 by setting LIST to NULL (empty). The next step 138 calls the "compute non-view references" subroutine (Table 3 and FIG. 7) for read-node $R_k$, which returns a LIST of all other read-nodes that share a view that uses read-node $R_k$ (i.e., every read-node with an arc from any view that has an arc whose subgraph contains the read-node $R_k$). This finds the read-nodes in the nested scopes and is required because the VIEWs, like the base tables, are not included in any of the nested scopes or in the query scope.

After step 130 returns with a LIST of nodes $\{N_n\}$, step 140 starts a n-indexed loop to scan each node $N_n$ in the LIST. For each common-referencing node pair $(W_j, N_n)$, steps 142 and 144 evaluate each to determine a "representative" version of it in the "deepest common scope" of the two. This particular requirement is necessary only because of the special characteristics of triggers discussed above. Each statement and condition of a trigger "body" is nested into a single trigger node in graph G and may contain internal read- or write-nodes that are outside of the "scope" of other nodes in graph G.

Step 146 tests whether $W_R==N_R$. If $W_R==N_R$ is true, then the conflicting node pair has a trigger box for a deepest common ancestor and they are in the same trigger. The SQL semantics will determine an ordering of W and $R_k$. In step 147, the poke query is applied to this ordering to ensure that the ordering is enforced with proper data-flow sequencing. Thus, if W is ordered before $R_k$ by the SQL semantics, Wsub is poked into $R_k$, where Wsub is the top of the subgraph beneath Wrep that contains W. In accordance with the model of FIG. 15, Wsub is the box R and N is the box D. If $R_k$ is ordered before W by the SQL semantics, Nsub is poked into W, where Nsub is the top of the subgraph beneath Nrep that contains $R_k$. In accordance with the model of FIG. 15, Nsub is the box R and W is the box D.

If $W_R==N_R$ is false, step 148 tests write-node $W_R$ to determine whether it is on the path of read-node $N_R$. If it is, step 150 places a dam on the arc closest to write-node $W_R$ on the path from $N_R$ if $W_R==W$, and pokes $N_R$ into W if $W_R!=W$. Except for triggers, representative node $W_R=W_j$.

If the representative write-node is not reachable from the representative read-node, then step 152 tests whether $N_R$ is the same as N, and if it is, then step 154 immediately calls the "place write-before-read dams" subroutine in Table 2, passing it Nrep, N, Wrep and RA (an arc whose subgraph contains the read R of table T). This subroutine includes a test of whether the read-node is reachable from the write-node. This test ensures that other read-nodes that are not on the path between $W_j$ and $R_k$, but which may be reading data that is also read by read-node $R_k$, are included in the subsequent evaluation. If $N_R$ is not the same as $N_n$, step 153 tests $N_R$ to see if it is on the path from $W_R$. If it is, then a dam is not sufficient to force the write before the read because the scan that $R_k$ represents can be performed at any time and shipped to any other node for processing. Hence step 155 pokes $W_R$ into $R_k$ to ensure that the subgraph at $W_R$ is completed before the scan that $R_k$ represents. In accordance with the model of FIG. 15, $W_R$ is the box R and $R_k$ is the box D. If the order of $N_R$ and $W_R$ cannot be determined, step 157 calls the SQL semantics and a poke is made according to the determined order.

After exhausting the LIST in the n-indexed loop at step 156, and after exhausting the read-nodes $\{R_k\}$ from Table $T_i$ at step 158, the procedure reinitiates the k-indexed loop at step 160 (FIG. 5B), which steps through all write-nodes $\{W_k\}$ for base table $T_i$ other than the current j-loop write-node $W_j$. Step 162 tests the two common-referencing write-node $W_j$ and $W_k$ to determine whether both are in the same "strongly-connected" component (such as a cyclic subgraph or recursive loop). Step 162 operates to prevent dam insertion between two strongly-connected write-nodes because such damming would interrupt a recursive loop and conclusively prevent query completion.

After determining that the two common-referencing write-nodes are not recursively involved, steps 164 and 166 duplicate the "scoping" process of steps 142 and 144 (FIG. 5A) to accommodate triggers. Step 168 tests whether $W_{RK}==W_{RJ}$. If $W_{RK}==W_{RJ}$ is true, then the conflicting node pair has a trigger box for a deepest common ancestor and they are in the same trigger. The SQL semantics will determine an ordering of $W_K$ and $W_J$. In step 169, the poke query is applied to this ordering to ensure that the ordering is enforced with proper data-flow sequencing. Thus, if $W_K$ is ordered before $W_J$ by the SQL semantics, W'sub is poked into $W_J$, where W'sub is the top of the subgraph beneath $W_{RK}$ that contains $W_K$. In accordance with the model of FIG. 15, W'sub is the box R and $W_J$ is the box D. If $W_J$ is ordered before $W_K$ by the SQL semantics, Wsub is poked into $W_K$, where Wsub is the top of the subgraph beneath $W_{RJ}$ that contains $W_J$. In accordance with the model of FIG. 15, Wsub is the box R and $W_K$ is the box D.

If $W_{RJ}==W_{RK}$ is false in step 168, step 170 then tests node $W_{RK}$ to see if its "reachable" (on the path of) from node $W_{RJ}$. If so, step 172 places a dam on the arc closest to $W_{RK}$ on the path from $W_{RJ}$ to $W_{RK}$ that is not in a strongly connected component if $W_{RK}=W_K$ is true, and pokes Wsub into $W_K$ if $W_{RK}=W_K$ is false. Without triggers, representative node $W_{RK}=W_K$.

If representative node $W_{RK}$ is not reachable from write-node $W_{RJ}$ and if $W_{RJ}$ is found to be reachable from $W_{RK}$ at step 176, then step 178 places a dam on the arc closest to $W_{RJ}$ on the path from $W_{RK}$ to $W_{RJ}$ that is not in a strongly connected component if $W_{RJ}=W_j$ is true, and pokes W'sub into $W_J$ if $W_{RJ}=W_J$ is false. Without triggers, representative node $W_{RJ}=W_J$. If the order of $W_{RJ}$ and $W_{RK}$ cannot be determined, step 179 calls the SQL semantics and a poke is made according to the determined order. Finally, the new k-loop is exhausted at step 180, the j-loop exhausted at step 182 and the I-loop exhausted at step 184, thereby ending the process at 186.

Figure 6:
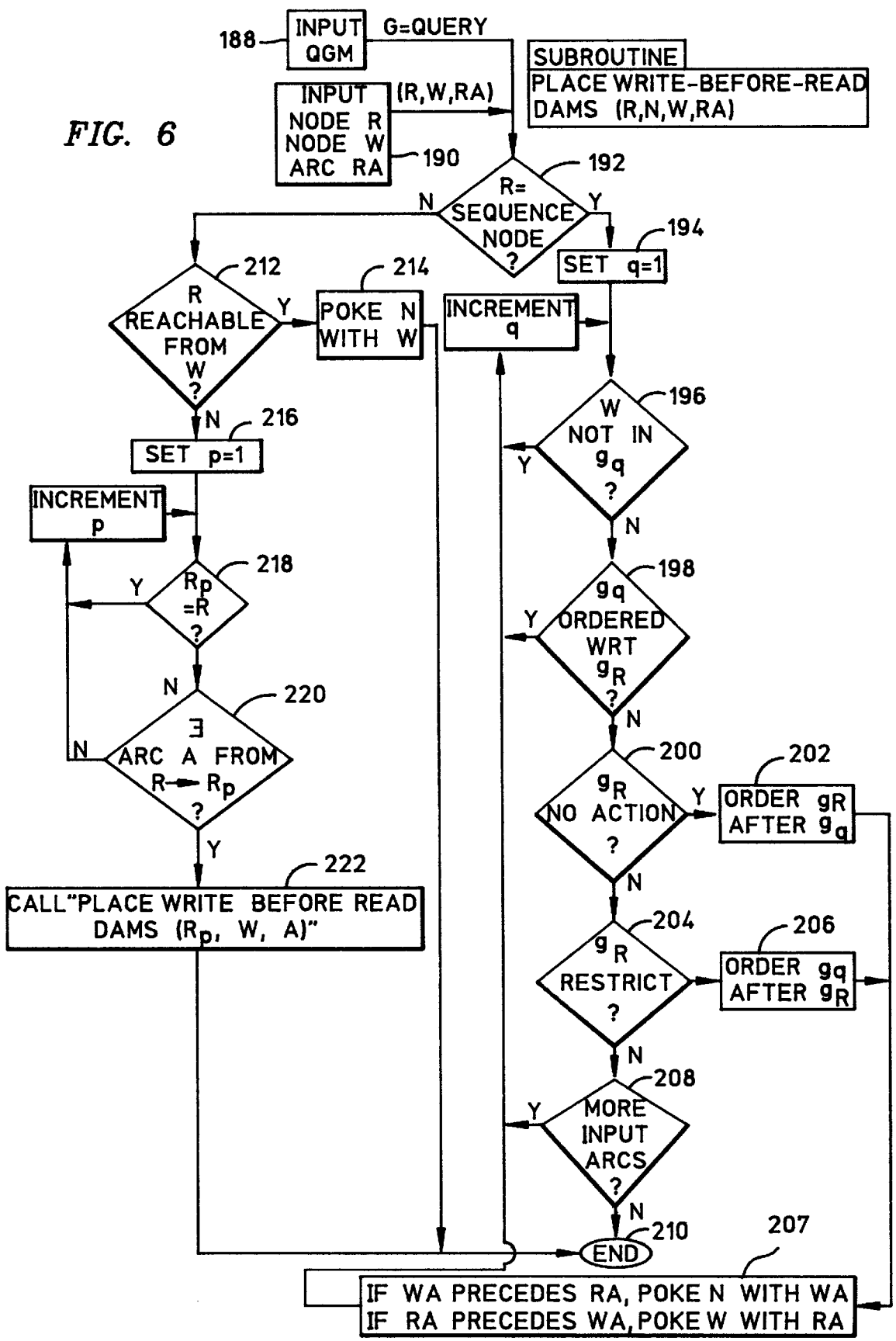
FIG. 6 is a functional block diagram of a flowchart showing a preferred embodiment of the "write-before-read" subroutine recited in FIG. 5.

The pseudocode in Table 2 can be understood with reference to the following description of FIG. 6. The "place write-before-read dams" subroutine requires the input QGM at 188 and also requires the input of a read-node R representing the "representative" LIST node $N_R$ from FIG. 5, the original base table scan-node N, a write-node W representing the j-loop write-node $W_j$ from FIG. 5, and a data-flow arc RA representing any arc whose subgraph $g_R$ contains the read-node R. The read-node R from 190 is tested at step 192 to determine if it is a SEQUENCE node-type. If it is, step 194 initiates a q-index loop on the set of input arcs $\{WA_q\}$ to read-node R. Step 196 then tests the subgraph $g_q$ for input arc $WA_q$ to find write-node W. If write-node W is included in subgraph $g_q$, then subgraph $g_q$ is tested against the subgraph $g_R$ for read-node R to determine if their execution is ordered. If the two data-flow arcs from subgraphs $g_q$ and $g_R$ are not already constrained in some order, then step 200 tests the read-node subgraph $g_R$ to see if it represents a no-action constraint and, if so, step 202 orders subgraph $g_R$ after the subgraph $g_q$. If not, then step 204 tests the read-node subgraph $g_R$ to see if it represents a restriction constraint and, if so, step 206 orders subgraph $g_q$ after subgraph $g_R$. Following the ordering steps 202 and 206, step 207 pokes N with WA if WA precedes RA, and pokes W with RA if RA precedes WA. Finally, step 208 exhausts the q-loop and the process ends at step 210. Note that restrict constraints must be evaluated before any cascaded actions are applied while no-action constraints must be evaluated only after all cascaded actions are applied.

The effect of the "place write-before-read dams" subroutine in FIG. 6 is to impose an order of completion for the subgraphs if none exists. This is not a problem in triggers because all trigger actions are already ordered so the only unordered subgraphs found in graph G must represent either constraint checking or enforcement. Note that the SEQUENCE node type of this invention is sufficient in itself to resolve write-before-read mutating table integrity problems without data-flow dams.

If step 192 finds that read-node R is not of the SEQUENCE node-type, then step 212 tests read-node R to determine if it is reachable from write-node W, and, if so, step 214 pokes N with. The process then ends at step 210.

If read-node R is not reachable from write-node W in step 212, then step 216 initiates a p-index loop to scan all common-referencing read-nodes $\{R_p\}$ in graph G. After step 218 eliminates read-node R from consideration, step 220 checks for a data-flow arc between read-node R and indexed read-node $R_p$. If such a connection exists, then step 222 calls the "place write-before-read dams" subroutine again for read-node $R_p$. Step 222 essentially forces recursion through the subroutine in FIG. 6 for every common-referencing read-node on the path from read-node R.

Figure 7:
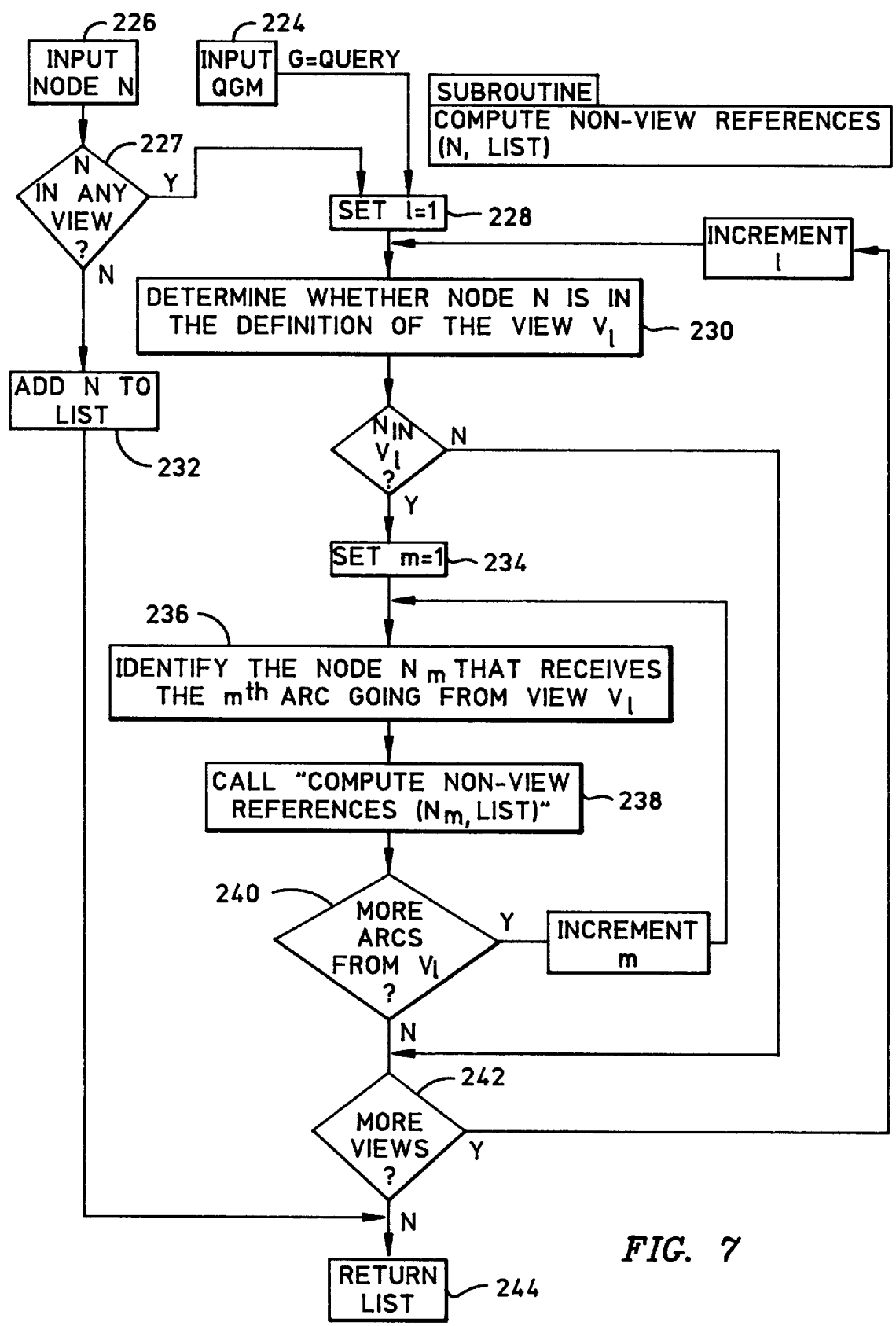
FIG. 7 is a functional block diagram of a flowchart showing the preferred embodiment of the "compute non-view references" subroutine recited in FIG. 5.

The pseudocode of Table 3 may be appreciated with reference to FIG. 7, which is now described. The "compute non-view references" subroutine in FIG. 7 accepts the input QGM from 224 and also receives the identity of an input node N from 226. Step 227 tests input node N to determine if it is used in any view. If it is not, node N is added to all LIST in step 232 and the LIST is returned at step 244 with the single new entry (this subroutine may be repeatedly called from within itself at step 238). If node N is referenced by some view, then step 228 begins a l-index loop to scan all view nodes $\{V_1\}$. For each view node, step 230 determines whether the read-node N is in the definition of the view-node $V_1$. If N is not in $V_1$, then step 242 indexes to the next view by incrementing the l-index. If N is in $V_1$, then step 234 initiates a m-index loop to scan all data-flow arcs from view-node $V_1$. Step 236 identifies the node $N_m$ that receives the $m^{th}$ data-flow arc arriving from view-node $V_1$. With this read-node $N_m$, step 238 calls the "compute non-view references" subroutine again. Step 240 exhausts the m-loop on the data-flow arcs from view-node $V_1$ and step 242 exhausts the l-loop on view-nodes. Step 244 returns LIST to the calling process. The effect of the "compute non-view references" subroutine in FIG. 7 is to compile a list of "leaf-nodes" that share a view with the subject read-node N argument specified in the subroutine call.

In addition to the procedures discussed above in connection with Tables 1–3 and FIGS. 5–7, the process of this invention also resolves row-level operations in CURSORs. If the SELECT query of an updatable CURSOR references the base table to be modified or references any base table that may be affected because of a cascaded DELETE or cascaded UPDATE from the prospective modification, then the SELECT or some portion of it must be dammed. When creating the CURSOR SELECT query graph, the base tables subject to UPDATE by subsequent positioned DELETEs and positioned UPDATEs are identified with their cursor-positioning read-nodes. Table 4 provides a preferred pseudocode embodiment of the process of this invention for computing dam placement for the SELECT query of an updatable CURSOR:

TABLE 4

```
prevent_mutating_table_violations_cursor(G   /* query graph for the
                                                cursor definition */)
begin
    LBASE = NULL;
    CASC_MODS = NULL;
    for each base table T in G that could be updated/deleted in a
    subsequent positioned update or positioned delete
    {
    add T to LBASE;
    if <UPDATE, T> is not in CASC_MODS
    {
        compute_casc-mods(UPDATE, T, CASC_MODS);
    }
    if <DELETE, T> is not in CASC_MODS
    {
        compute_casc_mods(DELETE, T, CASC_MODS);
    }
    }
    /* prevent write-write conflicts */
    for each pair <op, op_tab> in CASC_MODS
    {
    if there exists a non-cursor positioning read-node R of op_tab   in G
    {
        place the dam on the input arc to TOP;
        goto exit;
    }
    }
    /* prevent write-write conflicts */
    for each table T in LBASE
    {
    for each pair <op, op_tab> in CASC_MODS
    {
        if (T == op_tab)
        {
        place the dam on the input arc to TOP
        goto exit;
        }
    }
    }
exit:
end
```

Table 5 provides a preferred pseudocode embodiment of the "compute_casc_mods (op, op_table, casc_mods, G)" subroutine called from Table 4.

TABLE 5

```
compute_casc_mods(op,     /* update, delete or insert */
                  op_table, /* base table object of the operation op */
                  CASC_MODS,/ * list of operation-table pairs */
                  G      /* query graph */)
begin
    if(op==UPDATE or op==DELETE)
    {
    for each referential constraint R where op_table is a parent
    {
        C = child table in R;
```

TABLE 5-continued

```
        if((op==UPDATE and
            the update action of R is CASCADE, SET NULL, or SET DEFAULT)
            or
            (op==DELETE and
            the delete action of R is SET NULL or SET DEFAULT)
            )
        {
            if(<UPDATE, C> is not in CASC_MODS)
            {
                add the pair <UPDATE, C> to CASC_MODS;
                compute_casc_mods(UPDATE, C, CASC_MODS);
            }
        }
        if(op==DELETE and
            the delete action of R is CASCADE)
        {
            if<DELETE, C> is not in CASC_MODS
            {
                add the pair <DELETE, C> to CASC_MODS;
                compute_casc_mods(DELETE, C, CASC_MODS);
            }
        }
    }
}
for each trigger S that triggers on
    operation op applied to table op_table
{
    for each update statement in the body of S on some table Q
    {
        add <UPDATE, Q> CASC_MODS;
        compute_casc_mods(UPDATE, Q, CASC_MODS);
    }
    for each delete statement in the body of S on some table Q
    {
        if(<DELETE, Q> is not in CASC_MODS)
        {
            add <DELETE, Q> to CASC_MODS;
            compute_casc_mods(DELETE, Q, CASC_MODS);
        }
    }
    for each insert statement in the body of S on some table Q
    {
        if(<INSERT, Q> is not in CASC_MODS)
        {
            add <INSERT, Q> to CASC_MODS;
            compute_case_mods(INSERT, Q, CASC_MODS);
        }
    }
}
end
```

Figure 8A:
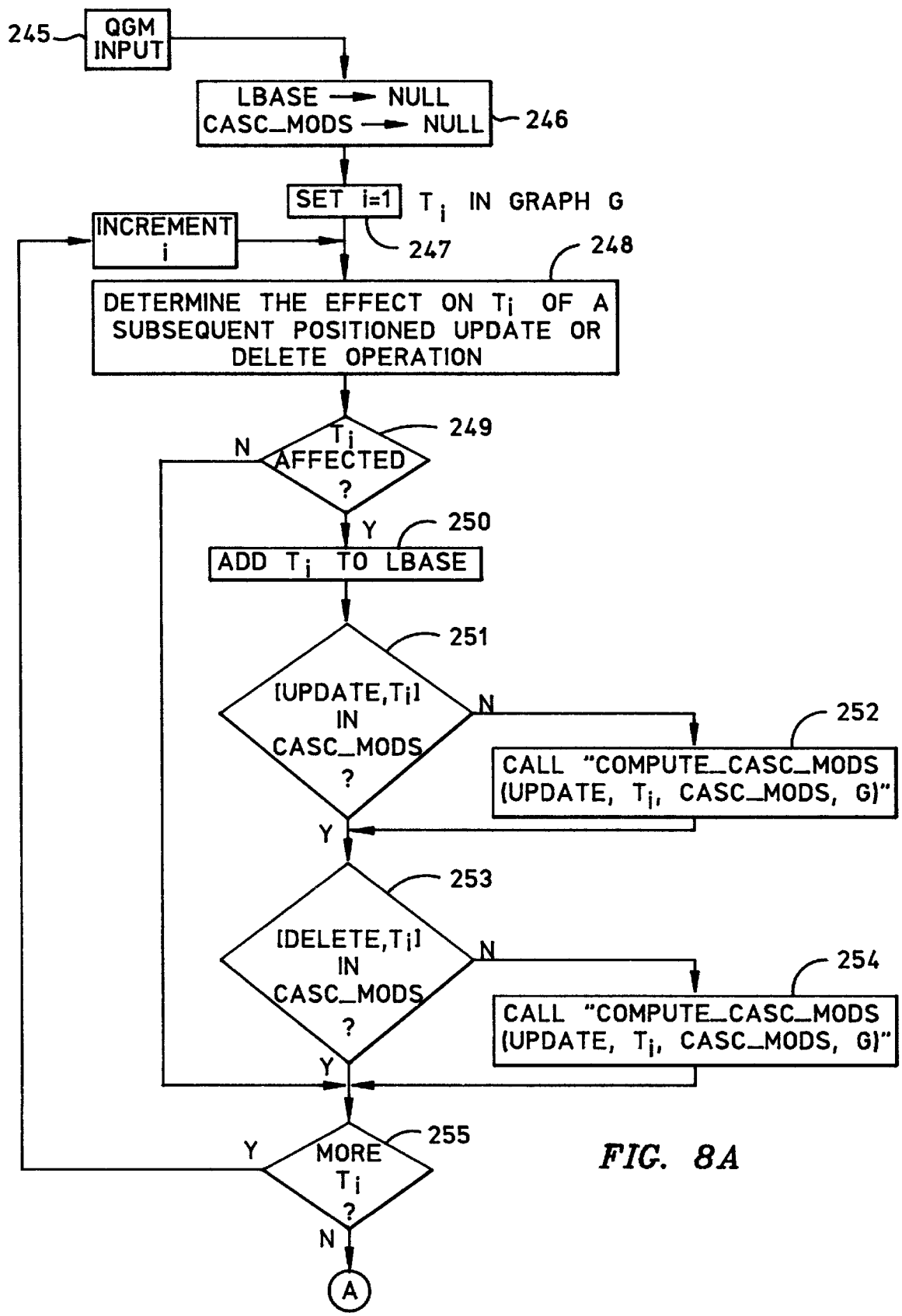
FIGS. 8A–8B, is a functional block diagram of a flowchart showing a preferred embodiment of the procedure of this invention for preventing mutating table violations in a SQL CURSOR definition query.
Figure 8B:
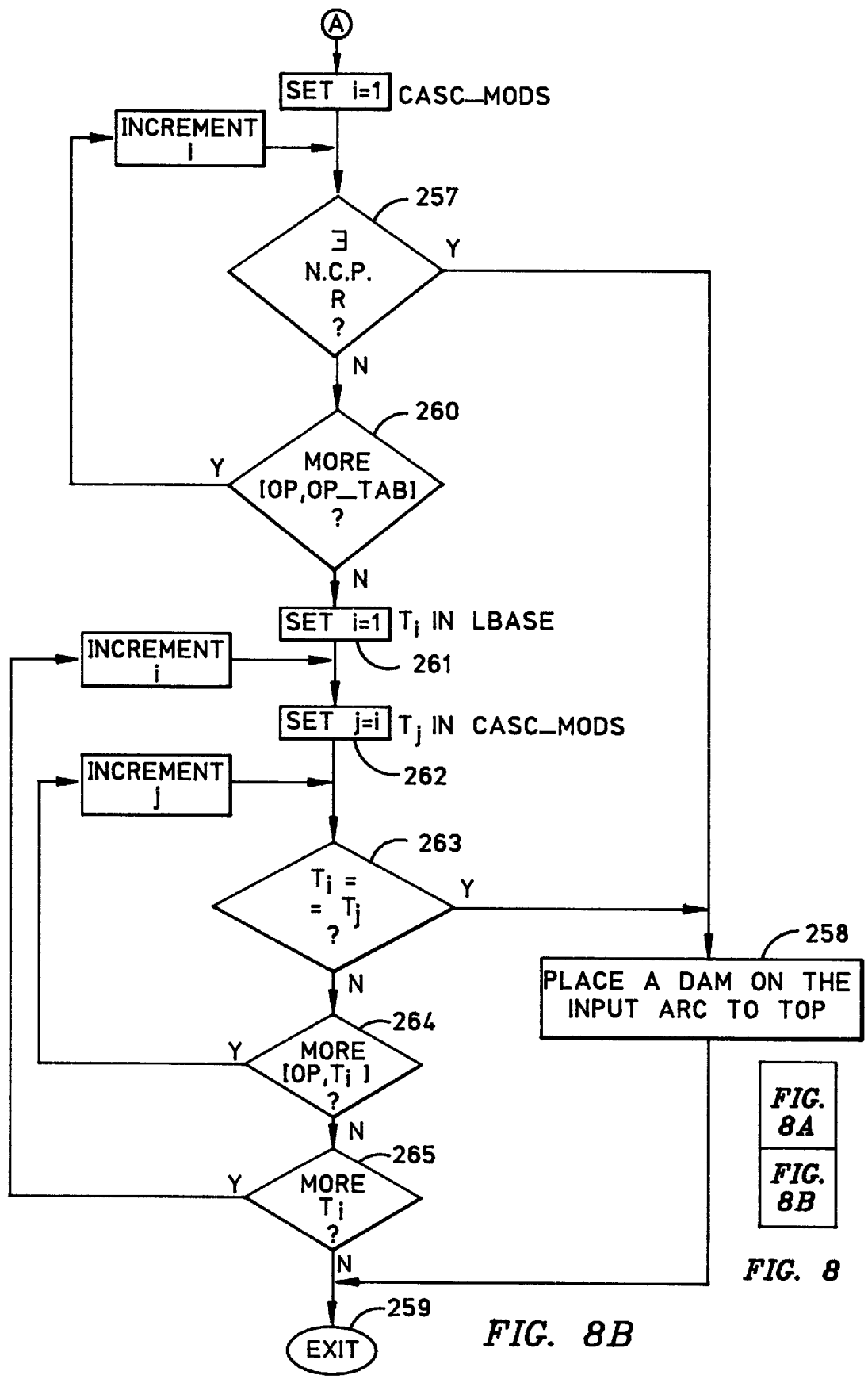

The pseudocode in Table 4 may be understood with reference to the flow chart shown in FIGS. 8A–8B, which is now described. The input 245 in FIG. 8A is the QGM for the updatable cursor definition query, denominated G. In step 246, the two tables LBASE and CASC_MODS are emptied before beginning the I-index loop at step 247 to scan all base tables $\{T_i\}$ in the query graph G. At step 248, the $i^{th}$ table $T_i$ is evaluated to determine the effect on it of a subsequent positioned UPDATE or positioned DELETE operation. Step 249 then asks if base table $T_i$ would be affected if this were a DELETE or UPDATE instead of a SELECT operation. If base table $T_i$ would be affected by such hypothesis, step 250 adds base table $T_i$ to LBASE.

CASC_MOD is a listing of [op, op_table] pairs. In step 251 CASC_MODS is tested for the presence of an [UPDATE, $T_i$] entry. If not found, then step 252 calls the "compute_casc_mods(UPDATE, $T_1$, CASC_MODS, G)" subroutine. That is, if base table $T_i$ would be affected by a hypothetical UPDATE operation, the resulting cascade modifications are added to CASC_MODS if not already present. Steps 253 and 254 accomplish the same result for a hypothetical DELETE operation. Step 255 exits the I-loop after exhausting $\{T_i\}$ in graph G.

In FIG. 8B, step 256 begins a second I-index loop to scan the $\{[op, op\_table]_i\}$ pairs in the CASC_MODS table. For the $i^{th}$ [op, op_table]$_i$ entry in CASC_MODS, step 257 tests to see if there exists a non-cursor positioning (N.C.P.) read-node that receives data-flow from "op_table" in query graph G. If such a read-node R is found, the process immediately places a dam on the input data-flow arc to the TOP node in the cursor definition query graph at step 258, after which it exits at step 259. Step 260 exhausts {[op, op_table]$_i$} to close the I-loop if step 257 finds no non-cursor positioning read-node R for the base table "op-table" referenced in the $i^{th}$ CASC_MODS entry.

Step 261 initiates another I-index loop on the base table $\{T_i\}$ listed in LBASE and step 262 begins an inner j-index loop on the entries $\{[op, T]_j\}$ in CASC_MODS. Thus, for each base table $T_i$ in LBASE, every entry [op, T]$_j$ in CASC_MODS is tested to see if the base-table $T_j$ from CASC_MODS is the same as base-table $T_i$ from LBASE. If these two base tables are found to be the same at step 263, then the process branches to step 258 to place a dam on the data-flow arc into the TOP node of the cursor definition query graph and exits at step 259. Steps 264 and 265 close the two index loops after exhausting CASC_MODS and LBASE, respectively.

Figure 13A:
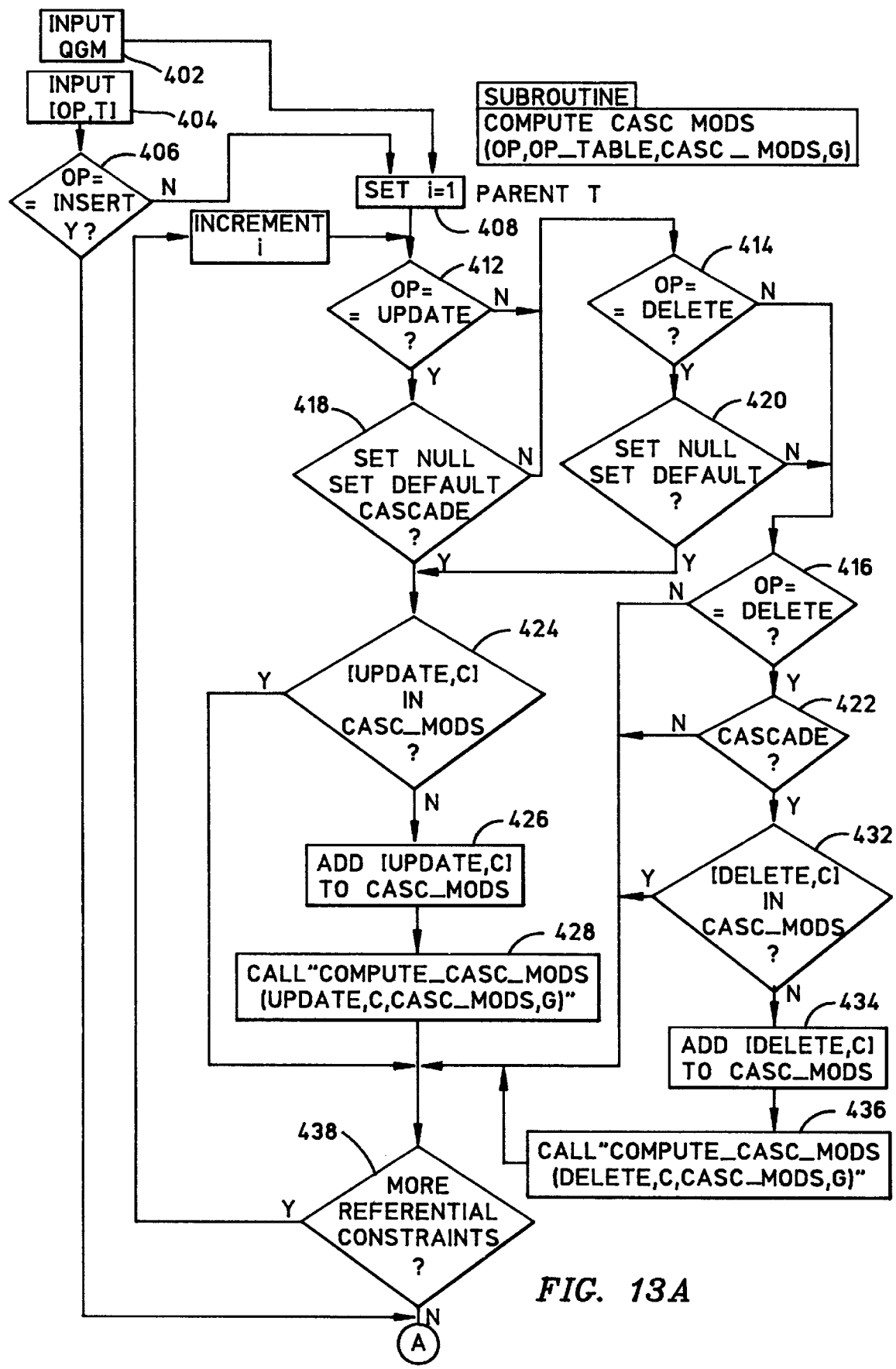
FIGS. 13A–13C, is a functional block diagram of a flowchart showing a preferred embodiment of the "compute cascade modifications" subroutine recited in FIG. 8.
Figure 13B:
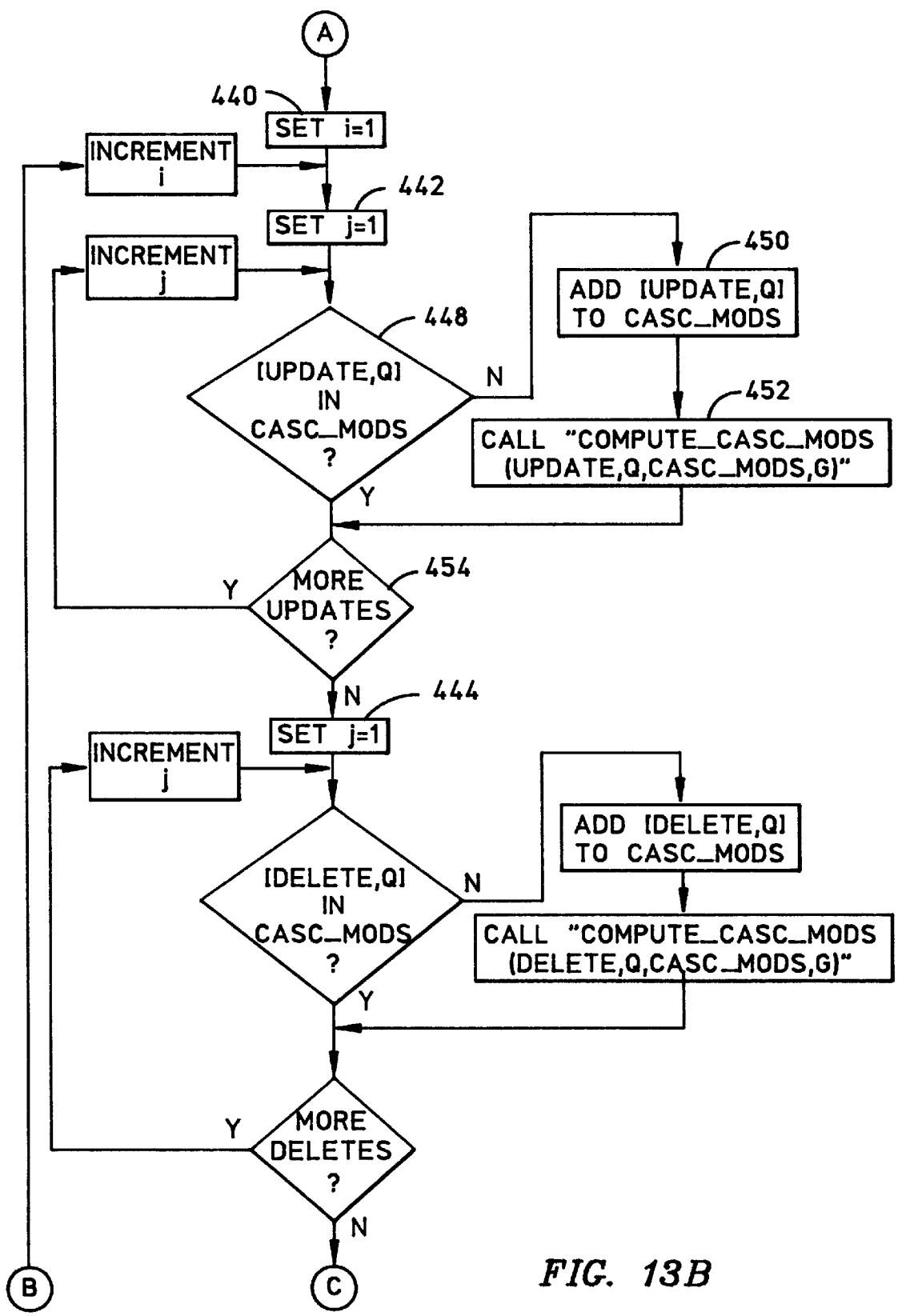
Figure 13C:
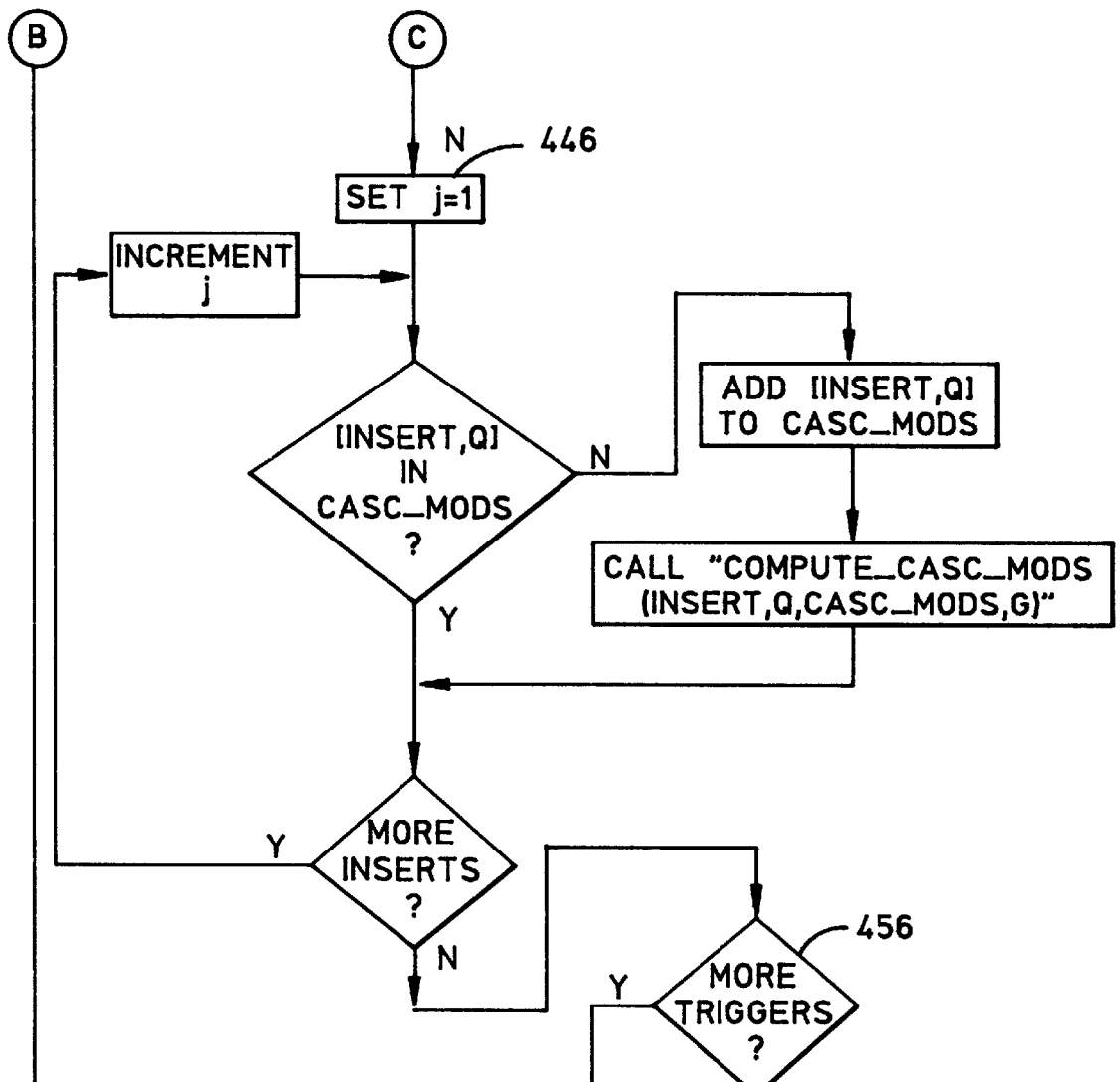

The pseudocode in Table 5 can be appreciated with reference to the flowchart in FIGS. 13A–13C which is now described. The input to the "compute_casc_mods(op, op_table, CASC_MODS, G)" subroutine is the QGM at 402 and a specified [op, op_table] entry at 404. Immediately upon entry, the subroutine tests the specified operation "op" at step 406 to see if it is an INSERT operation. If it is not, step 408 begins an I-index loop to scan all referential constraints $\{R_i\}$ imposed by "op_table" as a parent table T.

Step 412 first tests the operation "op" to see if it is an UPDATE operation. If it is not, then step 414 tests "op" to see if it is a DELETE operation. If not a DELETE operation, then step 414 transfers the process to step 416 and therefrom to the bottom of the I-loop. If step 412 finds an UPDATE operation, then step 418 tests the UPDATE action of referential constraint $R_i$ to see if it is SET NULL, SET DEFAULT or CASCADE. If not any of these, then the process proceeds to step 414 (and therefrom through 416 to the bottom of the I-loop). If step 414 finds a DELETE operation, then step 420 tests the DELETE action of the referential constraint $R_i$ to see if it is either SET NULL or SET DEFAULT. If neither, the process proceeds to step 416 and therefrom to step 422, which tests for a CASCADE DELETE action in $R_i$, proceeding to the bottom of the I-loop if not found.

If either step 418 or 420 succeeds, then step 424 looks for a [UPDATE, C] entry in CASC_MODS, proceeding to the bottom of the I-loop if it exists. If not, then step 426 adds the necessary [UPDATE, C] entry to CASC_MODS and then calls the "compute_casc_mods (UPDATE, C, CASC_MODS, G)" subroutine to initiate a nested execution at step 428. Similarly, if step 422 succeeds, then step 432 looks for a [DELETE, C] entry in CASC_MODS and adds the necessary entry at step 434 before making a nested subroutine call at step 436 if not found. After returning from steps 428 or 436, the I-loop is closed at step 438 upon exhausting all referential constraints $\{R_i\}$ imposed by the table T.

In FIG. 13B, the outer I-index loop is initiated at step 440 to scan all triggers $\{S_i\}$ that trigger on the specified "op" applied to the specified "op_table". Within the I-loop, three separate j-index loops are sequentially arranged to scan the UPDATE, DELETE and INSERT statements within the body of the trigger $S_i$. Thus, step 442 begins the j-index loop for the UPDATE statements in trigger $S_i$, step 444 begins the j-index loop for the DELETE statements in the body of trigger $S_i$ and step 446 (FIG. 13C) begins the j-index loop for scanning the INSERT statement within the body of trigger $S_i$. Each of these three inner j-loops may be understood with reference to the following description of the first.

For the $j^{th}$ UPDATE statement within $i^{th}$ trigger $S_i$, step 448 checks for an [UPDATE, Q] entry in CASC_MODS, where Q is the base table updated by the $j^{th}$ UPDATE statement in trigger $S_i$. If not found in CASC_MODS, step 450 adds [UPDATE, Q] to CASC_MODS and then makes a recursive call to the "compute _casc_mods (UPDATE, Q, CASC_MODS, G)" subroutine at step 452. Upon return from the nested subroutine call, step 454 terminates the first j-loop upon exhaustion of UPDATE statements in trigger $S_i$. Finally, in FIG. 13C, after repeating this process for DELETE and INSERT statements in $i^{th}$ trigger $S_i$, step 456 terminates the I-loop upon exhaustion of the triggers $\{S_i\}$ and returns at step 458 to end the subroutine call.

Data-flow Barrier Placement And Poke Query Examples

Figure 9A:
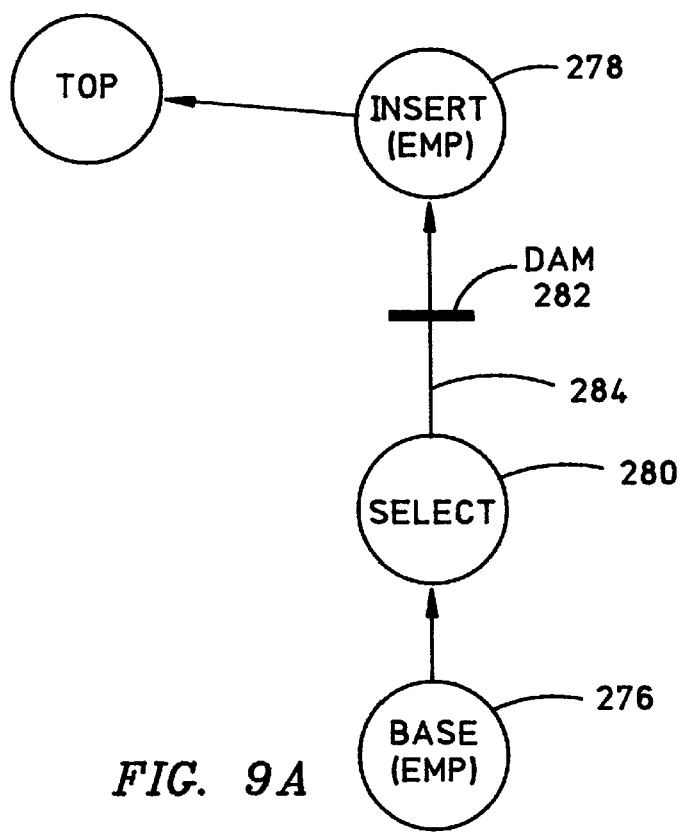
FIGS. 9A–9G provide exemplary query graphs to illustrate several examples of the application of the method of this invention to formerly prohibited SQL queries.

The process of this invention is now described in connection with the several examples shown in FIGS. 9A–9G. Referring to FIG. 9A, base-node 276 represents base table EMP according to the following CREATE TABLE definition. The remainder of the query graph in FIG. 9A represents the subsequent SQL query:

CREATE TABLE EMP(EMPNO INT NOT NULL,
WORKSIN VARCHAR (1),
REPORTSTO VARCHAR (2));
INSERT INTO EMP VALUES
(1,'A','B'),
(2,'A','B'),
(3,'B','C');
INSERT INTO EMP SELECT * FROM EMP;

This query includes a mutating table violation wherein beginning the INSERT action of the write-node 278 before completion of the SELECT subquery at read-node 280 may cause base table EMP to grow infinitely. According to the method of this invention, a dam 282 is inserted in the data-flow arc 284, which is the "arc closest to write-node 278 on the path from read-node 280 to write-node 278 that is not also in a strongly-connected component" (FIG. 5 at step 150). Dam 282 forces the select at read-node 280 to be completed before flowing the resulting data along arc 284 to write-node 278. This effect arises from the preservation of arc 284 in all QGM rewrites generated during query optimization; that is, pipelining through or merger of nodes 280 and 278 is prohibited during optimization.

Figure 9B:
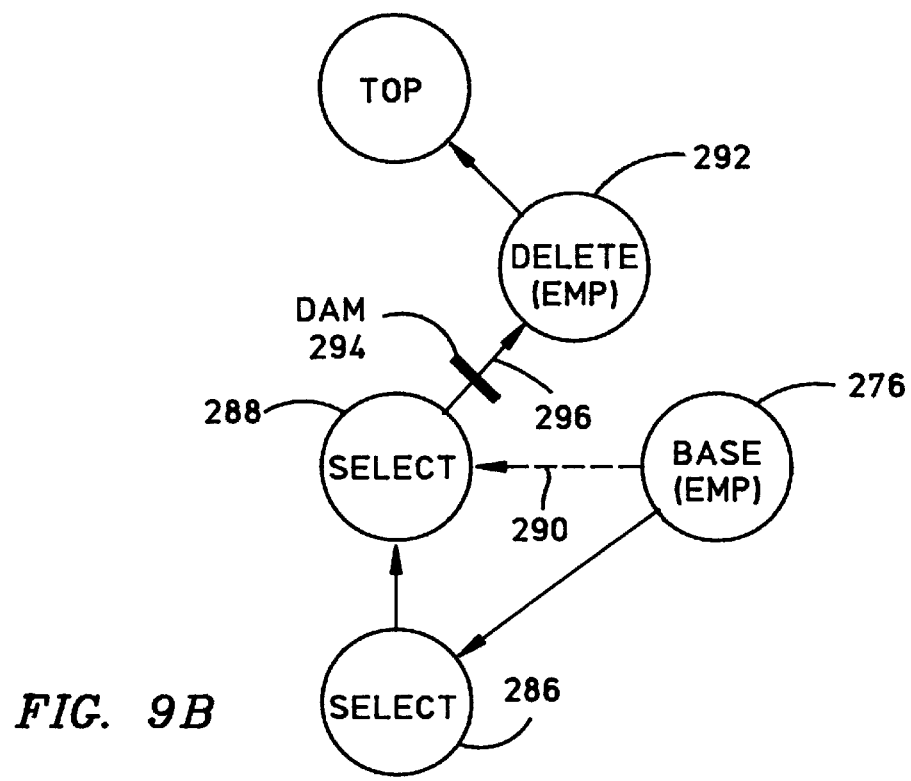

FIG. 9B provides the query graph model for the following query:

DELETE FROM EMP
WHERE WORKSIN IN (SELECT REPORTSTO FROM EMP
WHERE EMPNO=1);

This SQL query attempts to delete all employees that work in the same department that employee 1 reports to. The SELECT node 286 reads records from base node 276 and selects those records satisfying the internal predicate (not shown) specified by the "(SELECT REPORTSTO FROM EMP WHERE EMPNO=1)" portion of the SQL query. The second SELECT node 288 accepts records from select node 286 and applies the internal predicate specified by the "WHERE WORKSIN IN" portion of the SQL query to the results of the cursor-positioning arc 290. SELECT node 288 also has a cursor-positioning arc 290 from base table 276, which represents the requirement of node 288 to index through the EMP table while selecting records from node 286.

The DELETE node 292 is a write-node that operates on base table EMP. SELECT node 286 is a read-node that operates on base table EMP. Although select node 288 does read base table EMP, this is ignored by the method of this invention, which does not treat cursor-positioning arc 290 (nor any other "cursor-positioning" arc) as an element of the subgraph feeding select node 288. Once again, a data-flow dam 294 is inserted in the data-flow arc 296 to overcome the implied violation of database integrity. Arc 296 is the "input arc closest to write-node 292 on the path from the read-node 286 to the write-node 292 that is not also in a strongly-connected component" (FIG. 5 at step 150). Dam 294 forces the completion of the table represented by select node 286 before commencing modification of base table EMP responsive to the DELETE node 292.

Figure 9C:
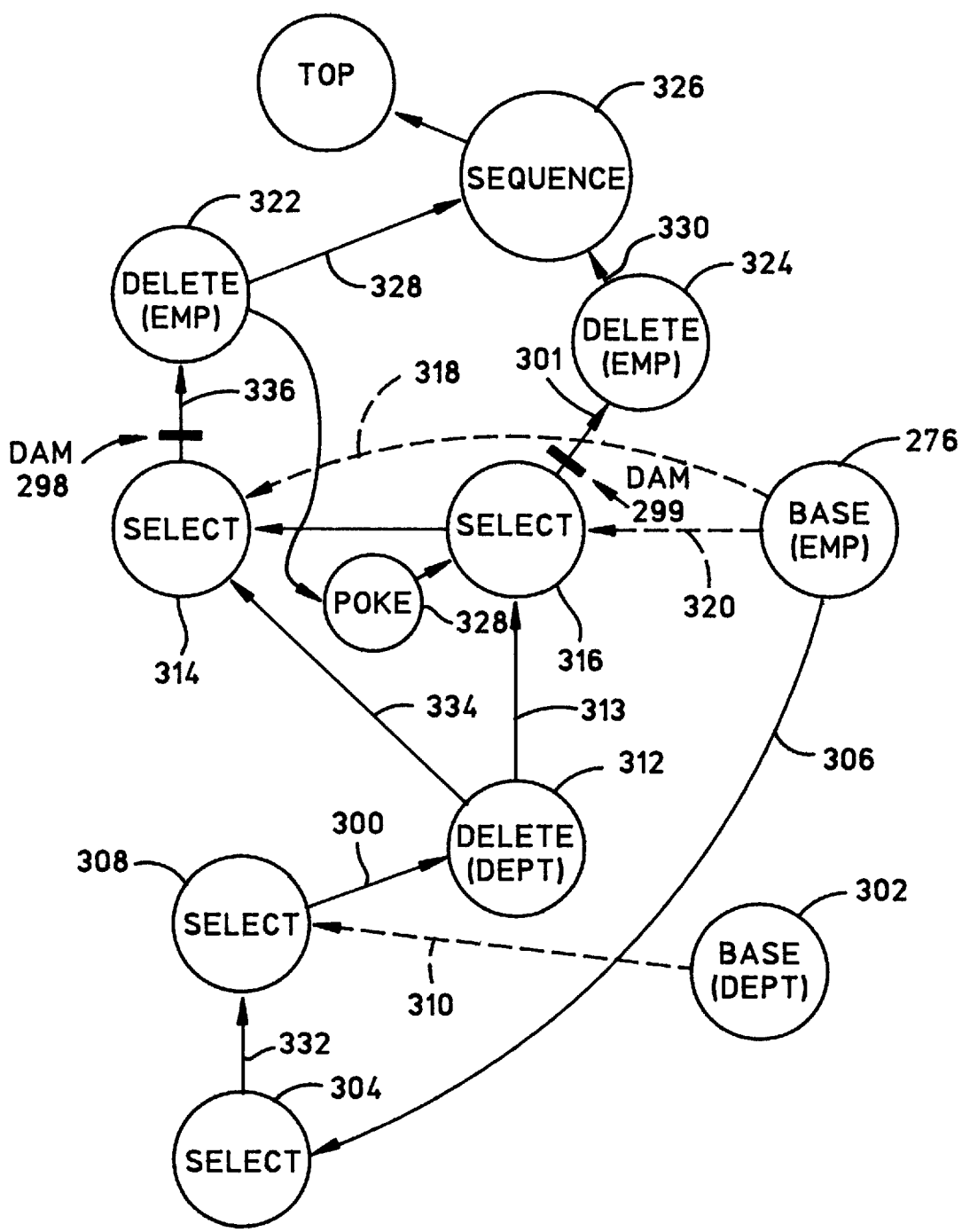

Proceeding to the example in FIG. 9C, a new base table DEPT is created according to the specification:

CREATE TABLE DEPT (DEPTNO VARCHAR (1) NOT NULL PRIMARY KEY,
DEPTNAME VARCHAR(10),
MGR INT);

INSERT INTO DEPT VALUES ('A', 'APPLES', 3),
('B', 'BANANAS', 1),
('C', 'CHERRIES', 2);

The base table EMP is altered to add foreign key references to DEPT as follows:

ALTER TABLE EMP
ADD FOREIGN KEY WD (WORKSIN)
REFERENCES DEPT ON DELETE CASCADE
ADD FOREIGN KEY RD (REPORTSTO)
REFERENCES DEPT ON DELETE CASCADE

The query graph in FIG. 9C represents the following query:

DELETE FROM DEPT
WHERE DEPTNO NOT IN (SELECT REPORTSTO
FROM EMP
WHERE EMP.REPORTSTO=DEPT.DEPTNO);

This query attempts to delete all departments that do not have employees reporting to it. This is a mutating table integrity violation when the subquery is not fully computed because the result is dependent on the order in which the rows in DEPT are processed. This same example is discussed above in connection with FIGS. 3E–3G.

In accordance with the procedure of this invention, two data-flow dams 298 and 299 are added to the data-flow arcs 336 and 301, respectively, to eliminate the mutating table integrity violation from the query graph model, thereby permitting the user to submit and successfully execute the above query, which would otherwise be rejected as an error at run-time.

Referring to FIG. 9C, DEPT is represented by base node 302. The SELECT node 304 reads the records from EMP on a data-flow arc 306. SELECT node 308, with the assistance of a cursor-positioning access to DEPT on arc 310, selects records from node 302 that satisfy the WHERE EMP.REPORTSTO=DEPT.DEPTNO internal predicate (not shown). The write-node 312 operates on DEPT to DELETE FROM DEPT. The two select nodes 314 and 316 receive records from write-node 312 that indicate what records are deleted from DEPT. SELECT node 314 checks EMP, by way of cursor-positioning arc 318, for records that must be deleted responsive to the foreign key RD references to DEPT. Similarly, select node 316 reviews EMP in connection with the foreign key WD cascade requirements, with the assistance of the cursor-positioning arc 320.

The DELETE node 322 operates on EMP responsive to the data-flow from SELECT node 314. The DELETE node 324 similarly deletes records from EMP responsive to records from SELECT node 316. Thus, write-nodes 322 and 324 are included in the query graph model of FIG. 9C to enforce the DELETE CASCADE requirements in the EMP foreign keys. The SEQUENCE node 326 indicates an order on the two incoming arcs 328 and 330. Assume that it orders 328 before 330. In a producer-driven system, this SEQUENCE node cannot fully enforce the ordering. Hence an additional poke node, 328, is added as input to 316 that will ensure that the activities of DELETE node 322 are completed before initiating the activities of DELETE node 324. Although the order is immaterial to this example, some order must be enforced and FIG. 9C illustrates the proper application of the poke node of the invention at node 328.

Because select node 304 is a read-node operating on EMP, read-node 304 and write-nodes 322 and 324 form two common-referencing node pairs on EMP, each of which must be reviewed for mutating table integrity violations in accordance with the process of this invention. Write-node 322 can be "reached from" read-node 304 (along arc 332 to node 308 and therefrom along arc 300 to node 312 and therefrom along arc 334 to node 314 and therefrom along arc 336 to write-node 322), so step 150 (FIG. 5) of this invention is executed, inserting the data-flow dam 298 in arc 336, which is the "arc closest to write-node 322 on the path from read-node 304 to write-node 322 that is not in a strongly-connected component". Similarly, write-node 324 can be reached from read-node 304 (along arc 322 to node 308 and therefrom along arc 300 to node 312 and therefrom along arc 313 to node 316 and therefrom along arc 301 to node 324), so step 150 (FIG. 5) is executed to insert data-flow dam 299 in arc 301, which is the "arc closest to write-node 324 on the path from read-node 304 to write-node 324 that is not in a strongly-connected component".

Figures 9D, 9E:
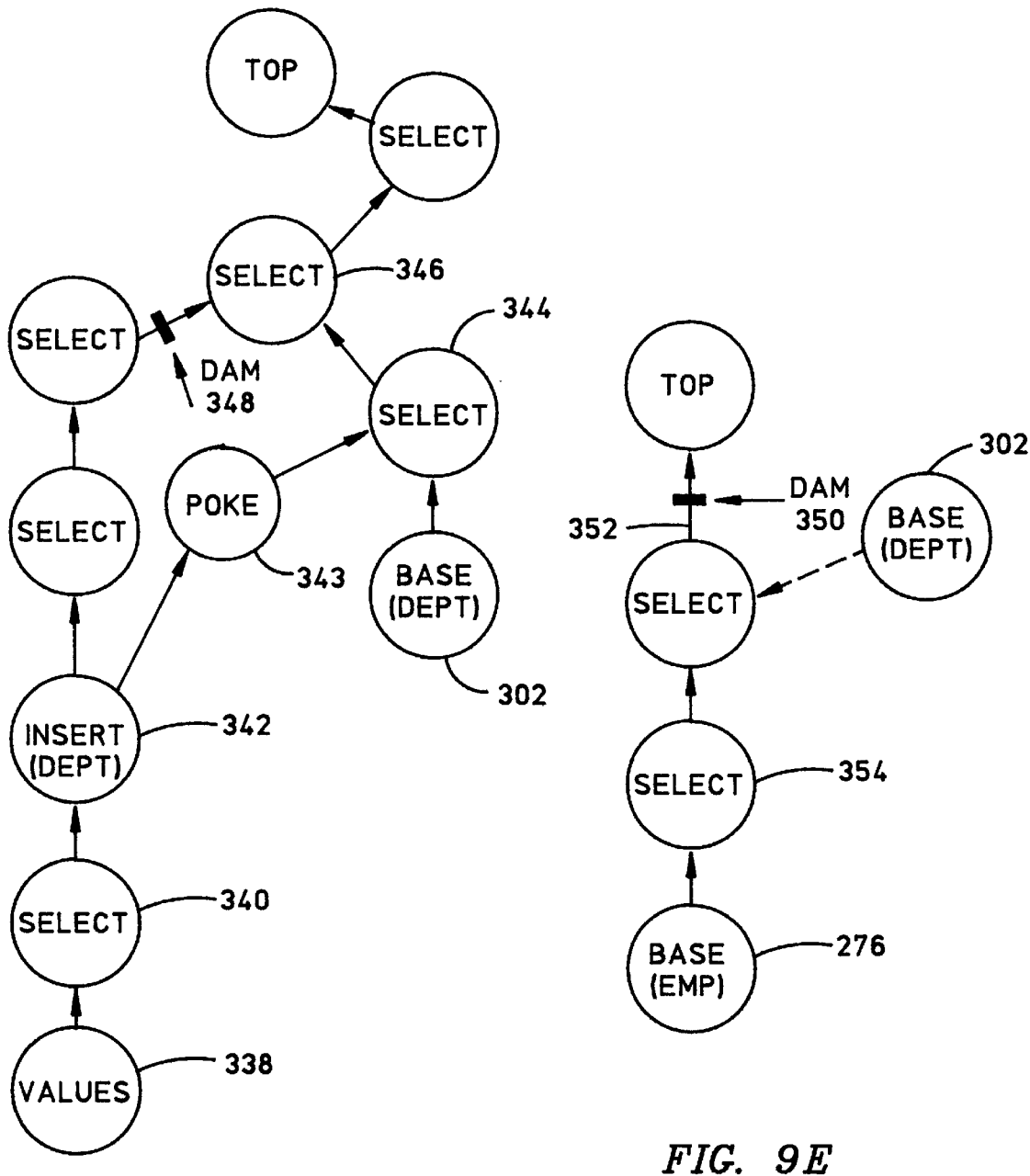

The example shown in FIG. 9D represents the following SQL query that inserts data into a new self-referencing four-column table called DEPT:

DROP TABLE DEPT
CREATE TABLE DEPT (DEPTNO VARCHAR (1) NOT
NULL PRIMARY KEY,
DEPTNAME VARCHAR (10),
ADMRDEPT VARCHAR (1),
MGR INT,
FOREIGN KEY ADM (ADMRDEPT)
REFERENCES DEPT);
INSERT INTO DEPT VALUES
('A', 'APPLES', 'A', 3),
('B', 'BANANAS', 'A', 1),
('C', 'CHERRIES', 'B', 2);

In FIG. 9D, the request to insert VALUES into DEPT creates a referential integrity violation because of the self-referencing foreign key ADM. Records from the VALUES node 338 are selected by SELECT node 340 for insertion into DEPT by INSERT node 342. SELECT node 344 is a read-node on DEPT and INSERT node 342 is a write-node on DEPT. Thus, nodes 342 and 344 make up a common-referencing node pair that must be evaluated for mutating table integrity violations according to this invention. In the example in FIG. 9D, SELECT node 346 is not a SEQUENCE node of this invention.

Although read-node 344 is not on the path of write-node 342, select node 346 is on that path and SELECT node 346 uses data from read-node 344. Accordingly, read-node 344 is found at step 220 (FIG. 6), which triggers step 222. During the execution of step 222, step 214 requires that the read node 344 be poked with the write node 342, thus assuring execution of the write node before the read. This example is similar to the example discussed above in connection with FIGS. 3A–3B.

FIG. 9E shows an example of a cursor definition query graph $G_C$ according to this invention. The graph in FIG. 9E corresponds to the following base table definitions and SQL query:

CREATE TABLE DEPT (DEPTNO VARCHAR (1) NOT
NULL PRIMARY KEY,
DEPTNAME VARCHAR (10),
MGR INT);
CREATE TABLE EMP (EMPNO INT NOT NULL,
WORKSIN VARCHAR (1),
REPORTSTO VARCHAR (1),
FOREIGN KEY WD (WORKSIN)
REFERENCES DEPT ON DELETE
CASCADE,
FOREIGN KEY RD (REPORTSTO)
REFERENCES DEPT ON DELETE
CASCADE);

```
DECLARE C1 CURSOR
    FOR SELECT * FROM DEPT
        WHERE EMGR IN SELECT EMPNO FROM
            EMP;
```

The DECLARE statement creates an "updatable cursor" known in the SQL database art. Dam 350 is inserted in arc 352 to ensure that the cursor contents are fully computed before any updates or deletes are applied that must cascade back to affect the cursor contents before completion. Referring to FIG. 8, step 250 requires that base table EMP be added to LBASE because it is affected by cascading deletes or updates from changes to base table DEPT. Either step 252 or step 254 call the "compute cascade modifications" subroutine of FIG. 13. Step 257 (FIG. 8B) looks for a non-cursor positioning read-node that is receiving data from the LBASE table $T_j$, which is EMP in this example. SELECT node 354 satisfies step 257 (FIG. 8), requiring execution of step 258 to insert dam 350 in TOP arc 352, which is "the input arc to TOP" of the updatable cursor definition query graph $G_C$.

Figure 9F:
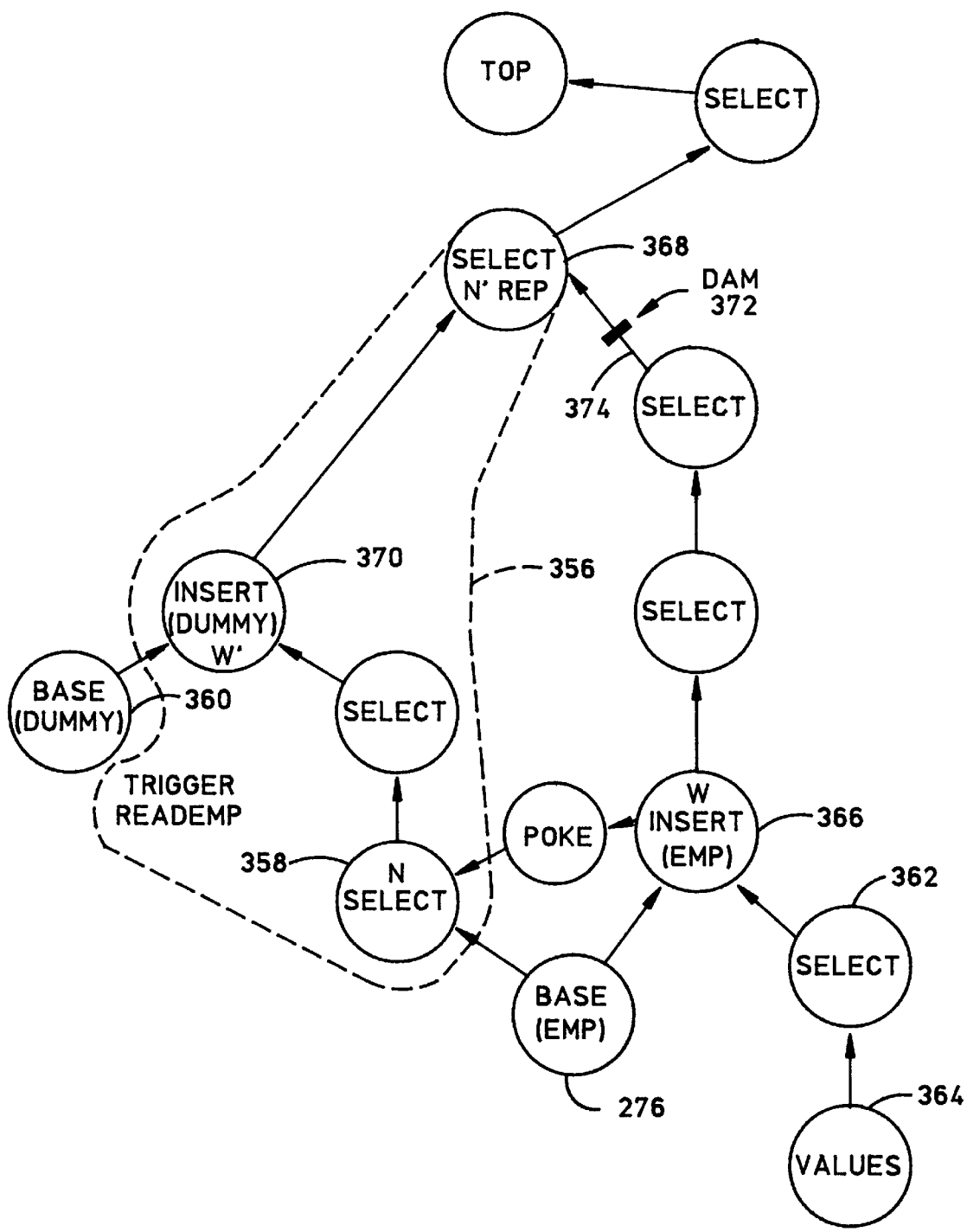

FIG. 9F provides a QGM for the following SQL query that includes a READEMP trigger:

```
CREATE TABLE EMP(EMPNO INT NOT NULL,
    WORKSIN VARCHAR(1),
    REPORTSTO VARCHAR(1));
CREATE TABLE DUMMY(EMPNO INT NOT NULL,
    WORKSIN VARCHAR (1),
    REPORTS TO VARCHAR(1));
CREATE TRIGGER READEMP AFTER INSERT ON
    EMP
FOR EACH ROW MODE DB2SQL
INSERT INTO DUMMY SELECT * FROM EMP;
INSERT INTO EMP VALUES
    (1, 'A', 'B'),
    (2, 'A', 'B'),
    (3, 'B', 'C').
```

The trigger READEMP is shown as a nested subgraph in the region 356 of FIG. 9F. Trigger 356 includes a read-node 358 on base table EMP (node 276) and includes a new base table DUMMY at node 360. Node 362 selects VALUES from 364 and presents them to the write-node 366 for INSERT into EMP. SELECT node 368 is the only trigger node within the "scope" of the query graph G; that is, the other nodes within trigger region 356 are not within "scope" of the remaining nodes in the query graph G. Node 370 is a write-node operating on base table DUMMY.

According to the procedure of this invention, the read-node 358 operating on base table EMP and write-node 366 also operating on base table EMP are first paired. Although read-node 358 is not within "scope" of write-node 366, select node 368 is a "representative" node $N_R$ of read-node 358 that is in scope of write-node 366. Accordingly, $N_R$ 368 is tested to see if it is "on the path of" write-node 366 and, because it is, the read node 358 is poked with the write node 366, thus assuring execution of the write node before the read node (FIG. 6 at step 214).

Figure 9G:
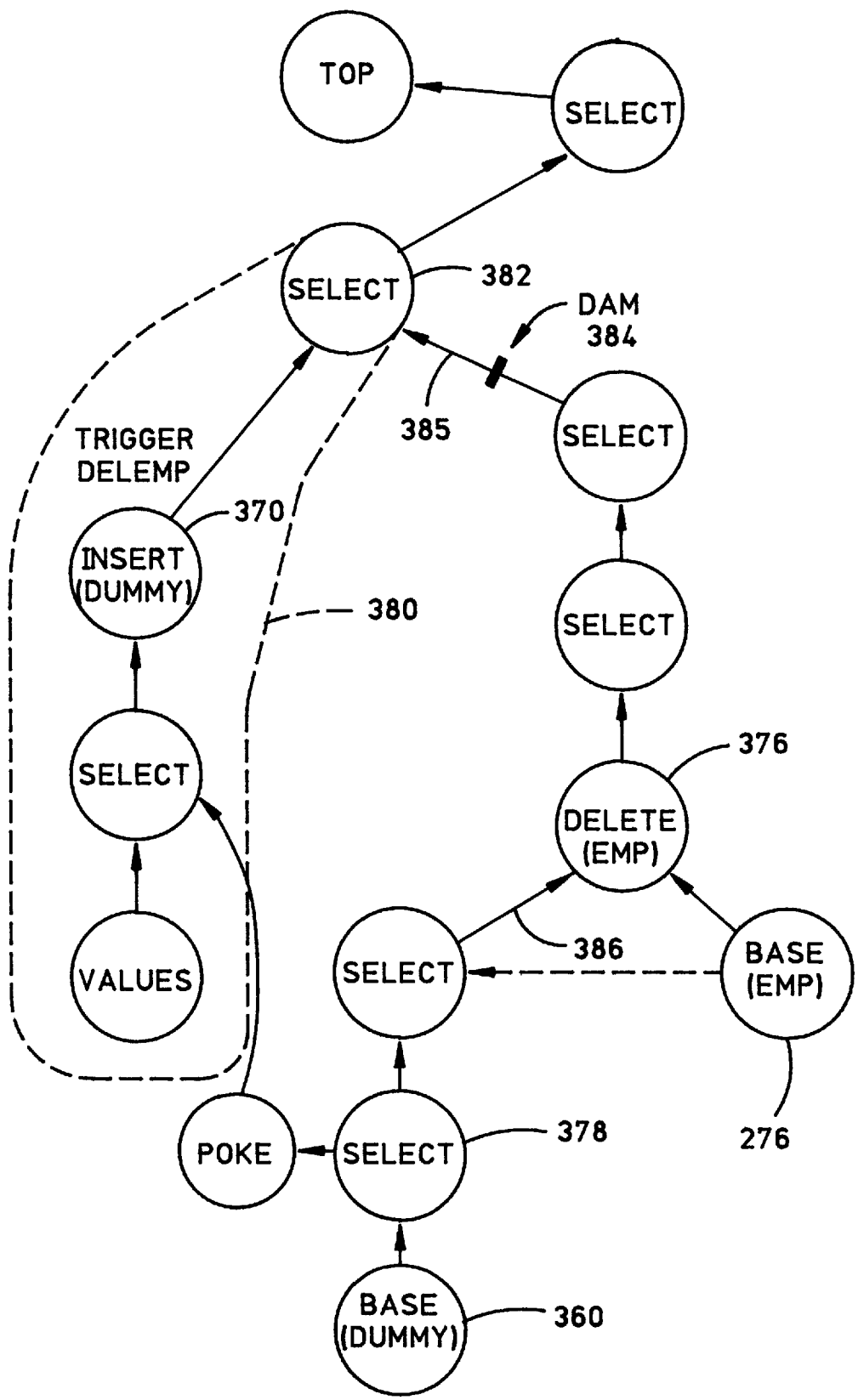

FIG. 9G shows the QGM for a second query example including a DELEMP trigger according to the following SQL query:

```
CREATE TRIGGER DELEMP AFTER DELETE ON
    EMP
FOR EACH ROW MODE DB2SQL
INSERT INTO DUMMY VALUES (OLD.EMPNO,
    OLD.WORKSIN, OLD.REPORTSTO);
DELETE FROM EMP
    WHERE EMPNO IN (SELECT EMPNO FROM
        DUMMY);
```

As before, the DELETE node 376 is a write-node operating on EMP and the INSERT node 370 is a write-node operating on DUMMY. There are no read-nodes operating on EMP but the SELECT node 378 operates on base table DUMMY. As with FIG. 9F, the trigger DELEMP includes a number of nodes within a region 380 that are not "within scope" of the remaining graph. However, each of these internal "nested scope" nodes can be resolved to the "representative" SELECT node 382, which is within scope of all other nodes in query graph G.

Accordingly, write-node 370 can be resolved to the "representative" node 382, thereby creating an "in-scope" common-referencing node pair, consisting of read-node 378 and "representative-write" node 382 both operating on base table DUMMY. Such a node pair must be tested for mutating table integrity violations according to this invention. This test simply determines if write-node 382 is on the path of read-node 378 (FIG. 5 at step 148). Indeed, node 382 can "be reached from" node 378 (although node 370 cannot), which satisfies step 152 of FIG. 5. However, since $W_R$ is not equal to $W_J$, the input to the write node 370 is poked with the read node 378. The poke forces the actualization of all tables in the subgraph beneath it before initiating activities in the input to the write node 370.

As described above, the process of this invention detects and prevents database integrity violations during table mutation in two ways. When two conflicting common-referencing relational nodes are not reachable from one another, the process of this invention uses a "POKE" node to impose an execution sequence on a plurality of outgoing data-flow arcs in the QGM. When each of the common-referencing node pair is "reachable" from the other, and ordering is not enforced by demand driven execution, the process of this invention inserts a data-flow barrier or "dam" in the path between the two conflicting common-referencing nodes if the write node is reachable from the read node, and if the read node is reachable from the write node, the process of this invention pokes the write node into the read node. If ordering is imposed by demand driven execution, as in the case of a trigger containing a common-referencing read and write nodes, the process of this invention pokes the first executing one of the conflicting nodes into the second executing one of the conflicting nodes. The process of this invention detects and prevents integrity violations arising from conflicts created by check constraints, triggers and referential constraints evaluated for given modification. Check constraints may require poke queries to resolve a write-before-read sequencing conflicts. Referential constraints may require poke queries to resolve write-before-read sequencing conflicts, read-before-write sequencing conflicts and sequencing needed to complete restrict-reads before starting cascade-writes and to restrict cascade-writes before starting no-action reads. Finally, triggers require poke queries to resolve read-before-write and write-before-read sequencing conflicts between trigger actions and other actions in the graph containing the trigger.

Figure 11:
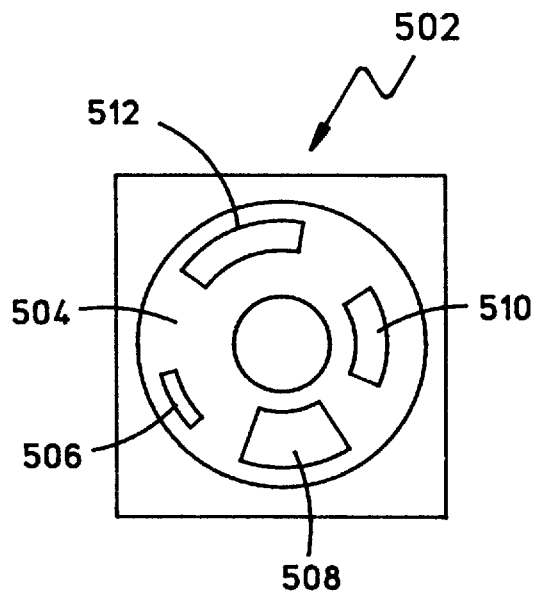
FIG. 11 shows a functional block diagram of a floppy disk exemplifying a computer program product according to this invention.

While this invention is primarily discussed as a method, it can be understood by a person of ordinary skill in the art that the apparatus discussed above in connection with FIG. 4 may be programmed or otherwise designed to facilitate the practice of the method of this invention. Also, an article of manufacture, for use with a data processing system, such as the prerecorded floppy disk 502 in FIG. 11 or other similar computer program product, could include a storage medium, such as magnetic storage medium 504, and program means recorded thereon, such as the program means 506, 508, 510 and 512 in FIG. 11, for directing the data processing system to facilitate the practice of the method of this invention. It can be understood that such apparatus and articles of manufacture also fall within the spirit and scope of this invention.

Clearly, other embodiments and modifications of this invention may occur readily to those of ordinary skill in the art in view of these teachings. Therefore, this invention is limited only by the following claims, which include all such embodiments and modifications when viewed in conjunction with the above specification and accompanying drawing.

We claim:

1. A method for optimizing the execution plan of a query that enforces database integrity in a relational database processing system having a stored database including a plurality of tables $\{T\}$ for processing queries represented by query graphs $\{G\}$ wherein each said query graph G includes a plurality of nodes $\{N_i\}$ each representing a relational operation, wherein each said node $N_i$ receives from each of one or more other said nodes $\{N_j\}$ a flow of records represented by a directed data-flow arc $A_{ji}$ forming part of a data-flow path and wherein i and j are positive integers, said method comprising the steps of:

(a) evaluating said query graph G for each said table $T_{each}$ to identify common-referencing pairs of said nodes for which said each table $T_{each}$ is the object;

(b) reforming said query graph G by either (i) restricting said data-flow path between the nodes of one or more of said common-referencing pairs of nodes or (ii) inserting a sub-query node between the nodes of one or more of said common-referencing pairs of nodes, or by separately performing both (i) and (ii) on respective ones of said common-referencing pairs of nodes to sequence the execution of each said common-referencing pair of nodes to produce a query graph $G_{MTI}$ that enforces database integrity during table mutation;

(c) generating a plurality of query execution plans for executing said query graph $G_{MTI}$; and (d) evaluating the execution cost of each said query execution plan and selecting an optimal query execution plan.

2. The method of claim 1 wherein said sub-query is a poke sub-query that passes data from a first node to a second node of said one or more common-referencing pairs of nodes to ensure that said first node executes before said second node.

3. The method of claim 2 wherein said poke sub-query produces a record for consumption by said second node or an input representative thereof.

4. The method of claim 3 wherein said query graph reforming step (b) further includes inserting a SELECT node before said second node if said second node does not already have an input SELECT node that ranges exclusively over the table T that is commonly referenced by said first and second node.

5. The method of claim 2 wherein said poke sub-query produces exactly one record for consumption by said second node or an input representative thereof.

6. The method of claim 1 wherein said nodes $\{N_i\}$ include one or more read-nodes $\{R_k\}$ each representing a read operation on at least one of said tables $\{T\}$ and one or more write-nodes $\{W_j\}$ each representing a write operation on at least one of said tables $\{T\}$, wherein k is a positive integer and wherein said evaluating step (a) comprises the steps of:

(a.1) identifying in said query graph G all of said write-nodes $\{W_j\}$ and all of said read-nodes $\{R_k\}$ that represent a read or write operation for which said each table $T_{each}$ is an object.

7. The method of claim 6 wherein said each node $N_i$ has a representative node that receives a flow of records from a subgraph $g_i$ that embraces some preceding portion of said graph G such that said representative node for said each node $N_i$ is reachable on said data-flow path from any other preceding said node $N_j$ representative in said subgraph $g_i$ and wherein said query graph reforming step (b) comprises the steps of:

(b.1) restricting said data-flow path for each said identified write-node $W_j$ which is its own representative node whose subgraph $g_j$ includes a node representing any said identified read-node $R_k$, if any, to require execution of said subgraph $g_j$ before executing said each identified write-node $W_j$;

(b.2) inserting a poke sub-query node for each said identified write-node $W_j$ having a representative node different from $W_j$ whose subgraph $g_j$ includes a node representing any other said identified read-node $R_k$, if any, to require execution of said any other said identified read-node $R_k$ before executing said each identified write-node $W_j$;

(b.3) restricting said data-flow path for each said identified write-node $W_j$ which is its own representative node and whose subgraph $g_j$ includes a node representing any other said identified write-node $W_i \neq W_j$, if any, to require execution of said any other said identified write-node $W_i \neq W_j$ before executing said each identified write-node $W_j$;

(b.4) inserting a poke sub-query node for each said identified write-node $W_j$ having a representative node different from $W_j$ whose subgraph $g_j$ includes a node representing any other said identified write-node $W_i \neq W_j$, if any, to require execution of said any other said identified write-node $W_i \neq W_j$ before executing said each identified write-node $W_j$; and (b.5) inserting a poke sub-query node for each said identified read-node $R_k$ having a representative node whose subgraph $g_k$ includes a node representing any said identified write-node $W_j$, if any, to require execution of said any identified write-node $W_j$ before executing said each identified read-node $R_k$.

8. The method of claim 7 further comprising the step of:

(e) assigning a SEQUENCE node constraint to a first said node $N_i$ receiving a flow of records on at least two said data-flow arcs $\{A_{ji}\}$ from other said nodes $\{N_j\}$, wherein said SEQUENCE node constraint forces each of said at least two data-flow arcs $\{A_{ji}\}$ to complete said flow of records upon initiation before starting said flow of records in another of said at least two data-flow arcs $\{A_{ji}\}$.

9. The method of claim 1 further comprising the step of:

(e) assigning a SEQUENCE node constraint to a first said node $N_i$ receiving a flow of records on at least two said data-flow arcs $\{A_{ji}\}$ from other said nodes $\{N_j\}$, wherein said SEQUENCE node constraint forces each of said at least two data-flow arcs $\{A_{ji}\}$ to complete said flow of records upon initiation before starting said flow of records in another of said at least two data-flow arcs $\{A_{ji}\}$.

10. The method of claim 1, wherein said relational database system is a producer-driven system.

11. A query optimizer system in a relational database processing system having a plurality of base tables $\{T\}$ for processing queries represented by query graphs $\{G\}$ wherein each said query graph G includes a plurality of nodes $\{N_i\}$ each representing a relational operation, wherein each said node $N_i$ receives from each of one or more other said nodes $\{N_j\}$ a flow of records represented by a directed data-flow arc $A_{ji}$ forming part of a data-flow path and wherein i, j are positive integers, said system comprising:

means for evaluating said query graph G for each said base table $T_{each}$ and identifying common-referencing pairs of said nodes;

query graph reforming means for reforming said query graph G by either (i) restricting said data-flow path between the nodes of one or more of said common-referencing pairs of nodes or (ii) inserting a sub-query node between the nodes of one or more of said common-referencing pairs of nodes, or by separately performing both (i) and (ii) on respective ones of said common-referencing pairs of nodes to sequence the execution of each said common-referencing pair of nodes to produce a query graph $G_{MTI}$ that enforces database integrity during table mutation;

query plan means coupled to said data-flow restriction means for generating a plurality of query execution plans for executing said query graph $G_{MTI}$; and query evaluation means coupled to said query plan means for evaluating the execution cost of each said query execution plan and for selecting an optimal said query execution plan.

12. The query optimizer system of claim 11 wherein said sub-query is a poke sub-query that passes data from a first node to a second node of said one or more common-referencing pairs of nodes to ensure that said first node executes before said second node.

13. The query optimizer system of claim 12 wherein said poke sub-query produces a record for consumption by said second node or an input representative thereof.

14. The query optimizer system of claim 13 wherein said query graph reforming means further includes means for inserting a SELECT node before said second node if said second node does not already have an input SELECT node that ranges exclusively over the base table T that is commonly referenced by said first and second node.

15. The query optimizer system of claim 12, wherein said poke sub-query produces exactly one record for consumption by said second node or an input representative thereof.

16. The query optimizer system of claim 11 wherein said nodes $\{N_i\}$ include one or more read-nodes $\{R_k\}$ each representing a read operation on at least one of said base tables $\{T\}$ and one or more write-nodes $\{W_j\}$ each representing a write operation on at least one of said base tables $\{T\}$, wherein k is a positive integer and wherein said base table review means comprises:

means for identifying in said query graph G all of said write-nodes $\{W_j\}$ and all of said read-nodes $\{R_k\}$ that represent a read or write operation for which said each base table $T_{each}$ is an object.

17. The query optimizer system of claim 16 wherein each node $N_i$ has a representative node that receives a flow of records from a subgraph $g_i$ that embraces some preceding portion of said graph G such that said representative node for said each node $N_i$ is reachable on said data-flow path from any other preceding said node $N_j$ representative in said subgraph $g_i$ and wherein said data-flow restriction means comprises:

first read-before-write means for restricting said data-flow path for each said identified write-node $W_j$ having a representative node whose subgraph $g_j$ includes a node representing any said identified read-node $R_k$, if any, to require execution of said subgraph $g_j$ before executing said each identified write-node $W_j$;

second read-before-write means for inserting a poke sub-query node for each said identified write-node $W_j$ having a representative node different from $W_j$ whose subgraph $g_j$ includes a node representing any other said identified read-node $R_k$, if any, to require execution of said any other said identified read-node $R_k$ before executing said each identified write-node $W_j$;

first write-before-write means for restricting said data-flow path for each said identified write-node $W_j$ which is its own representative node and whose subgraph $g_j$ includes a node representing any other said identified write-node $W_i \neq W_j$, if any, to require execution of said any other said identified write-node $W_i \neq W_j$ before executing said each identified write-node $W_j$;

second write-before-write means for inserting a poke sub-query for each said identified write-node $W_j$ having a representative node different from $W_j$ whose subgraph $g_j$ includes a node representing any other said identified write-node $W_i \neq W_j$, if any, to require execution of said any other said identified write-node $W_i \neq W_j$ before executing said each identified write-node $W_j$; and write-before-read means for inserting a poke sub-query node for each said identified read-node $R_k$ having a representative node whose subgraph $g_k$ includes a node representing any said identified write-node $W_j$, if any, to require execution of said any identified write-node $W_j$ before executing said each identified read-node $R_k$.

18. The query optimizer system of claim 17 wherein said data-flow restriction means further comprises:

sequencing means for assigning a SEQUENCE node constraint to a first said node $N_i$ receiving a flow of records on at least two said data-flow arcs $\{A_{ji}\}$ from other said nodes $\{N_j\}$, wherein said SEQUENCE node constraint forces each of said at least two data-flow arcs $\{A_{ji}\}$ to complete said flow of records upon initiation before starting said flow of records in another of said at least two data-flow arcs $\{A_{ji}\}$.

19. The query optimizer system of claim 11 wherein said query graph reforming means comprises:

sequencing means for assigning a SEQUENCE node constraint to a first said node $N_i$ receiving a flow of records on at least two said data-flow arcs $\{A_{ji}\}$ from other said nodes $\{N_j\}$, wherein said SEQUENCE node constraint forces each of said at least two data-flow arcs $\{A_{ji}\}$ to complete said flow of records upon initiation before starting said flow of records in another of said at least two data-flow arcs $\{A_{ji}\}$.

20. The query optimizer system of claim 11, wherein the relational database system is a producer-driven system.

21. A database processing system comprising:

a data store for storing a plurality of base tables $\{T\}$;

logical processing means for processing queries represented by query graphs $\{G\}$ wherein each said query graph G includes a plurality of nodes $\{N_i\}$ each representing a relational operation, wherein each said node $N_i$ receives from each of one or more other said nodes $\{N_j\}$ a flow of records represented by a directed data-flow arc $A_{ji}$ forming part of a data-flow path and wherein i, j are positive integers;

means for evaluating said query graph G for each said base table $T_{each}$ to identify common-referencing pairs of said nodes for which said each base table $T_{each}$ is the object;

query graph reforming means for reforming said query graph G by either (i) restricting said data-flow path between the nodes of one or more of said common-referencing pairs of nodes or (ii) inserting a sub-query node between the nodes of one or more of said common-referencing pairs of nodes, or by separately performing both (i) and (ii) on respective ones of said common-referencing pairs of nodes to sequence the execution of each said common-referencing pair of nodes to produce a query graph $G_{MTI}$ that enforces database integrity during table mutation;

query plan means coupled to said data-flow restriction means for generating a plurality of query execution plans for executing said query graph $G_{MTI}$; and query evaluation means coupled to said query plan means for evaluating the execution cost of each said query execution plan and for selecting an optimal said query execution plan.

22. The database processing system of claim 21 wherein said sub-query is a poke sub-query that passes data from a first node to a second node of said one or more common-referencing pairs of nodes to ensure that said first node executes before said second node.

23. The database processing system of claim 21 wherein said poke sub-query produces one record at a time for consumption by said second node or an input representative thereof.

24. The database processing system of claim 23 wherein said query graph reforming means further includes means for inserting a SELECT node before said second node if said second node does not already have an input SELECT node that ranges exclusively over the base table T that is commonly referenced by said first and second node.

25. The database processing system of claim 21 wherein said poke sub-query produces exactly one record for consumption by said second node or an input representative thereof.

26. The database processing system of claim 21 wherein said nodes $\{N_i\}$ include one or more read-nodes $\{R_k\}$ each representing a read operation on at least one of said base tables $\{T\}$ and one or more write-nodes $\{W_j\}$ each representing a write operation on at least one of said base tables $\{T\}$, wherein k is a positive integer and wherein said base table review means comprises:

means for identifying in said query graph G all of said write-nodes $\{W_j\}$ and all of said read-nodes $\{R_k\}$ that represent a read or write operation for which said each base table $T_{each}$ is an object.

27. The database processing system of claim 26 wherein said each node $N_i$ has a representative node that receives a flow of records from a subgraph $g_i$ that embraces some preceding portion of said graph G such that said representative node for said each node $N_i$ is reachable on said data-flow path from any other preceding said node $N_j$ representative in said subgraph $g_i$ and wherein said data-flow restriction means comprises:

first read-before-write means for restricting said data-flow path for each said identified write-node $W_j$ having a representative node whose subgraph $g_j$ includes a node representing any said identified read-node $R_k$, if any, to require execution of said subgraph $g_j$ before executing said each identified write-node $W_j$;

second read-before-write means for inserting a poke sub-query node for each said identified write-node $W_j$ having a representative node different from $W_j$ whose subgraph $g_j$ includes a node representing any other said identified read-node $R_k$, if any, to require execution of said any other said identified read-node $R_k$ before executing said each identified write-node $W_j$;

first write-before-write means for restricting said data-flow path for each said identified write-node $W_j$ which is its own representative node and whose subgraph $g_j$ includes a node representing any other said identified write-node $W_i \neq W_j$, if any, to require execution of said any other said identified write-node $W_i \neq W_j$ before executing said each identified write-node $W_j$;

second write-before-write means for inserting a poke sub-query for each said identified write-node $W_j$ having a representative node whose subgraph $g_j$ includes a node representing any other said identified write-node $W_i \neq W_j$, if any, to require execution of said any other said identified write-node $W_i \neq W_j$ before executing said each identified write-node $W_j$; and write-before-read means for inserting a poke sub-query for each said identified read-node $R_k$ having a representative node whose subgraph $g_k$ includes a node representing any said identified write-node $W_j$, if any, to require execution of said any identified write-node $W_j$ before executing said each identified read-node $R_k$.

28. The database processing system of claim 27 wherein said data-flow restriction means further comprises:

sequencing means for assigning a SEQUENCE node constraint to a first said node $N_i$ receiving a flow of records on at least two said data-flow arcs $\{A_{ji}\}$ from other said nodes $\{N_j\}$, wherein said SEQUENCE node constraint forces each of said at least two data-flow arcs $\{A_{ji}\}$ to complete said flow of records upon initiation before starting said flow of records in another of said at least two data-flow arcs $\{A_{ji}\}$.

29. The database processing system of claim 21 wherein said query graph reforming means comprises:

sequencing means for assigning a SEQUENCE node constraint to a first said node $N_i$ receiving a flow of records on at least two said data-flow arcs $\{A_{ji}\}$ from other said nodes $\{N_j\}$, wherein said SEQUENCE node constraint forces each of said at least two data-flow arcs $\{A_{ji}\}$ to complete said flow of records upon initiation before starting said flow of records in another of said at least two data-flow arcs $\{A_{ji}\}$.

30. The database processing system of claim 21, wherein the logical processing means includes a producer-driven computing system.

31. A computer program product, for use with a relational database processing system having a stored database including a plurality of base tables $\{T\}$ for processing queries represented by query graphs $\{G\}$ wherein each said query graph G includes a plurality of nodes $\{N_i\}$ each representing a relational operation, wherein each said node $N_i$ receives from each of one or more other said nodes $\{N_j\}$ a flow of records represented by a directed data-flow arc $A_{ji}$ forming part of a data-flow path and wherein i and j are positive integers, said computer program product comprising:

a recording medium;

means, recorded on said recording medium, for causing said system to evaluate said query graph G for each said base table $T_{each}$ to identify common-referencing pairs of said nodes for which said each base table $T_{each}$ is the object;

means, recorded on said recording medium, for causing said system to reform said query graph G to reform said query graph G by either (i) restricting said data-flow path between the nodes of one or more of said common-referencing pairs of nodes or (ii) inserting a sub-query node between the nodes of one or more of said common-referencing pairs of nodes, or by separately performing both (i) and (ii) on respective ones of said common-referencing pairs of nodes to sequence the execution of each said common-referencing pair of nodes to produce a query graph $G_{MTI}$ that enforces database integrity during table mutation;

means, recorded on said recording medium, for causing said system to generate a plurality of plans for executing said query graph $G_{MTI}$; and means, recorded on said recording medium, for causing said system to evaluate the execution cost of each said query execution plan and selecting said optimal query execution plan.

32. The computer program product of claim 31 wherein said sub-query is a poke sub-query that passes data from a first node to a second node of said one or more common-referencing pairs of nodes to ensure that said first node executes before said second node.

33. The computer program product of claim 32 wherein said poke sub-query produces one record at a time for consumption by said second node or an input representative thereof.

34. The computer program product of claim 33 wherein said query graph reforming means further includes means, recorded on said recording medium, for directing at least one of said logical processing units to insert a SELECT node before said second node if said second node does not already have an input SELECT node that ranges exclusively over the base table T that is commonly referenced by said first and second node.

35. The computer program product of claim 32, wherein said poke sub-query produces exactly one record for consumption by said second node or an input representative thereof.

36. The computer program product of claim 31 wherein said nodes $\{N_i\}$ include one or more read-nodes $\{R_k\}$ each representing a read operation on at least one of said base tables $\{T\}$ and one or more write-nodes $\{W_j\}$ each representing a write operation on at least one of said base tables $\{T\}$ and wherein k is a positive integer, said computer program product further comprising:

means, recorded on said recording medium, for causing said system identify in said query graph G all of said write-nodes $\{W_j\}$ and all of said read-nodes $\{R_k\}$ that represent a read or write operation for which said each base table $T_{each}$ is an object.

37. The computer program product of claim 29 wherein said each node $N_i$ has a representative node that receives a flow of records from a subgraph $g_i$ that embraces some preceding portion of said graph G such that said representative node for said each node $N_i$ is reachable on said data-flow path from any other preceding said node $N_j$ representative in said subgraph $g_i$, said computer program product further comprising:

means, recorded on said recording medium, for causing said system to restrict said data-flow path for each said identified write-node $W_j$ having a representative node whose subgraph $g_j$ includes a node representing any said identified read-node $R_k$, if any, to require execution of said subgraph $g_j$ before executing said each identified write-node $W_j$;

means, recorded on said recording medium, for causing said system to insert a poke sub-query node for each said identified write-node $W_j$ having a representative node different from $W_j$ whose subgraph $g_i$ includes a nose representing any other said identified read-node $R_k$, if any, to require execution of said any other said identifier read-node $R_k$ before executing said each identified write-node $W_j$;

means, recorded on said recording medium, for causing said system to restrict said data-flow path for each said identified write-node $W_j$ which is its own representative node and whose subgraph $g_j$ includes a node representing any other said identified write-node $W_i \neq W_j$, if any, to require execution of said any other said identified write-node $W_i \neq W_j$ before executing said each identified write-node $W_j$;

means, recorded on said recording medium, for causing said system to insert a poke sub-query node for each said identified write-node $W_j$ having a representative node whose subgraph $g_j$ includes a node representing any other said identified write-node $W_i \neq W_j$, if any, to require execution of said any other said identified write-node $W_i \neq W_j$ before executing said each identified write-node $W_j$; and means, recorded on said recording medium, for causing said system to insert a poke sub-query for each said identified read-node $R_k$ having a representative node whose subgraph $g_k$ includes a node representing any said identified write-node $W_j$, if any, to require execution of said any identified write-node $W_j$ before executing said each identified read-node $R_k$.

38. The computer program product of claim 37 further comprising:

means, recorded on said recording medium, for directing at least one of said logical processing units to assign a SEQUENCE node constraint to a first said node $N_i$ receiving a flow of records on at least two said data-flow arcs $\{A_{ji}\}$ from other said nodes $\{N_j\}$, wherein said SEQUENCE node constraint forces each of said at least two data-flow arcs $\{A_{ji}\}$ to complete said flow of records upon initiation before starting said flow of records in another of said at least two data-flow arcs $\{A_{ji}\}$.

39. The computer program product of claim 31 further comprising:

means, recorded on said recording medium, for directing at least one of said logical processing units to assign a SEQUENCE node constraint to a first said node $N_i$ receiving a flow of records on at least two said data-flow arcs $\{A_{ji}\}$ from other said nodes $\{N_j\}$, wherein said SEQUENCE node constraint forces each of said at least two data-flow arcs $\{A_{ji}\}$ to complete said flow of records upon initiation before starting said flow of records in another of said at least two data-flow arcs $\{A_{ji}\}$.

40. The computer program product of claim 31, wherein the relational database system is a producer-driven system.

* * * * *